US008253569B2

(12) United States Patent  
Choi

(10) Patent No.: US 8,253,569 B2  
(45) Date of Patent: Aug. 28, 2012

(54) SECURE ELECTROMAGNETIC DATA STORAGE ELEMENT HAVING A PLURALITY OF SELECTIVELY DETERMINED SWITCHABLE SECURITY MODES

(76) Inventor: Yu Yung Choi, Brooklyn, NY (US)

( * ) Notice: Subject to any disclaimer, the term of this patent is extended or adjusted under 35 U.S.C. 154(b) by 530 days.

(21) Appl. No.: 12/501,434

(22) Filed: Jul. 12, 2009

(65) Prior Publication Data

US 2009/0289774 A1  Nov. 26, 2009

Related U.S. Application Data

(63) Continuation-in-part of application No. 12/481,490, filed on Jun. 9, 2009.

(60) Provisional application No. 61/059,809, filed on Jun. 9, 2008, provisional application No. 61/082,243, filed on Jul. 21, 2008.

(51) Int. Cl.  
*G08B 13/14* (2006.01)

(52) U.S. Cl. ............... 340/572.1; 340/572.3; 340/572.4; 340/572.7; 340/572.8; 340/10.1; 340/10.4; 235/487; 235/492

(58) Field of Classification Search .............. 340/572.1, 340/572.3, 572.4, 572.7, 10.1, 10.3, 572.8, 340/10.4; 235/375, 376, 380, 487, 492, 383  
See application file for complete search history.

(56) References Cited

U.S. PATENT DOCUMENTS

| | | | |
|---|---|---|---|
| 4,307,275 A | 12/1981 | Larson et al. | |
| 4,314,117 A | 2/1982 | Ditzig | |
| 4,551,586 A | 11/1985 | Latasiewicz | |
| 4,987,275 A | 1/1991 | Miller et al. | |
| 6,285,342 B1 | 9/2001 | Brady et al. | |
| 6,343,744 B1 | 2/2002 | Shibata et al. | |
| 6,762,380 B2 | 7/2004 | Nelson et al. | |
| 7,211,760 B2 | 5/2007 | Takiguchi et al. | |
| 7,452,786 B2 | 11/2008 | Dozen et al. | |
| 7,477,151 B2 | 1/2009 | Forster et al. | |
| 2006/0187040 A1 | 8/2006 | Sweeney | |
| 2006/0266831 A1* | 11/2006 | Kozlay | ........................ 235/451 |
| 2007/0040653 A1* | 2/2007 | Potts et al. | ................... 340/10.1 |
| 2007/0069858 A1* | 3/2007 | Kubo | ........................... 340/10.1 |
| 2007/0152828 A1* | 7/2007 | Mohalik | .................... 340/572.3 |
| 2007/0290051 A1* | 12/2007 | Bielmann et al. | ............. 235/492 |
| 2008/0211675 A1 | 9/2008 | Forster et al. | |
| 2009/0027162 A1 | 1/2009 | Forster | |
| 2009/0027173 A1 | 1/2009 | Forster | |
| 2010/0123581 A1 | 5/2010 | Hatfield et al. | |

FOREIGN PATENT DOCUMENTS

| | | |
|---|---|---|
| JP | 2007-193478 A | 8/2007 |
| KR | 10-2005-0092331 A | 9/2005 |
| KR | 10-2007-0058282 A | 6/2007 |
| WO | 98-20450 A1 | 5/1998 |
| WO | 2009-015114 A1 | 1/2009 |

* cited by examiner

*Primary Examiner* — Hung T. Nguyen

(57) ABSTRACT

The apparatus of the present invention are directed to a selectively accessible electromagnetically resonant data storage element (implemented as a resonant tag, card, embedded element and/or similar devices), for inventory and facility control and management, for product tracking during transportation, for security purposes (e.g., personal identification (e.g., passports, driver's licenses, alien registration cards), access control, etc.), and to facilitate various forms of electronic information interchange (for example in electronic commerce, such as payment cards, etc.), that is selectively responsive to predetermined electromagnetic interrogation thereof, that comprises a novel membrane switch component for enabling a user to selectively enable and/or disable interrogatory access to the resonant component, to protect from unauthorized interrogation thereof. The novel membrane switch may be formed through a combination of aligned and configured subcomponents of at least a portion of the element within at least two stacked layers.

43 Claims, 17 Drawing Sheets

SECURE ELECTROMAGNETIC DATA STORAGE ELEMENT HAVING A PLURALITY OF SELECTIVELY DETERMINED SWITCHABLE SECURITY MODES

CROSS-REFERENCE TO RELATED APPLICATIONS

The present patent application is a continuation-in-part of, and claims priority from, the U.S. patent application of Yu Yung Choi, entitled "SECURE ELECTROMAGNETIC DATA STORAGE ELEMENT HAVING A PLURALITY OF SELECTIVELY DETERMINED SWITCHABLE SECURITY MODES" (Ser. No. 12/481,490), filed on Jun. 9, 2009, which in turn claims priority from U.S. Provisional Patent Application of Yu Yung Choi, entitled "MEMBRANE SWITCH FOR ENABLING AND DISABLING THE RESONANT TAG AND/OR CARD" (Ser. No. 61/059,809), filed on Jun. 9, 2008, and which also claims priority from U.S. Provisional Patent Application of Yu Yung Choi, entitled "MEMBRANE SWITCH FOR ENABLING AND DISABLING THE RESONANT TAG AND/OR CARD" (Ser. No. 61/082,243), filed on Jul. 21, 2008.

FIELD OF THE INVENTION

The present invention relates to contactless electromagnetically and/or magnetically resonant tags, cards, embedded components, and similar devices, that each comprise user-controlled means for enabling and disabling the device to protect it from unauthorized interrogation (and related methods) and, more particularly, to a resonant selectively accessible data storage element capable of being utilized in tag, card, embedded or other configurations, that is selectively responsive to predetermined electromagnetic interrogation thereof, and that comprises a novel membrane switch component, for enabling a user to selectively enable and/or disable interrogatory access to the resonant data storage element, to switch between security modes to continue utilization, and to protect it from unauthorized interrogation thereof.

BACKGROUND OF THE INVENTION

In recent years, there has been an accelerated growth in the use of contactless electromagnetic or magnetic resonant data storage ("RDS") devices (for example implemented as tags, card, embedded elements, and similar devices), for inventory and facility control and management, for product tracking during transportation (e.g., throughout a supply chain), for security purposes (e.g., personal identification (e.g., passports, driver's licenses, alien registration cards), access control, etc.), and to facilitate various forms of electronic information interchange (for example in electronic commerce, such as payment cards, etc.). As their cost decreases and their capabilities increase, these RDS devices are also finding their way into many other applications. The vast majority of RDS devices use one of two different contactless RDS technologies: RFID ("Radio Frequency Identification"), and RuBee active two-way wireless Long Wave (LW) technology, which is currently based on the IEEE physical layer specifications P1902.1 (and currently on the draft 1902.2 specification).

However, conventional RDS devices suffer from a serious disadvantage-specifically, an unauthorized party (with a compatible RDS device reader or equivalent) who is within a predefined interrogation range of a typical RDS device may be able to access, delete, and possibly even alter the data stored in the device. Clearly, this disadvantage becomes a critical issue in certain RDS applications, such as security and/or e-commerce, in which individuals' personal and/or financial information may be stored in the RDS device, and thus be subject to access and/or misappropriation by unauthorized third parties. The lack of protection against undesirable interrogation is of particular concerns with respect to RDS devices based on RuBee technology. Due to the long range, resistance to interference and "dead spots", and in view of the ability of RuBee's "Long Waves" magnetic field to penetrate many materials that would block RFID signals, RuBee-based RDS devices have a greater exposure and less defenses against unauthorized access thereto. Furthermore, the new RuBee draft 1902.2 specification which may enable RuBee-based RDS devices to directly access (and be accessed from) the Internet, focuses even more attention on the aforementioned RDS device access challenges.

Concerns over the abovementioned significant vulnerabilities of RDS devices, and over RDS device-related privacy considerations in general, have spurred the development of techniques to permanently disable an operational RDS device after a certain event has occurred (for example, after a RDS tagged product has been sold to the consumer). However, such a crude "solution" does not in any way address the numerous applications in which further use of the RDS device is necessary after the event, nor does it address the applications in which it may be desirable to keep a RDS device in an inactive mode until after a particular predetermined event occurs. Such applications may include, but are not limited to, situations in which the RDS device's information should be protected from surreptitious and/or unauthorized reading until after the RDS device-tagged product has been purchased, or the RDS device is otherwise authorized for access.

In order to address the above challenges, a number of solutions, described in greater detail below, have been proposed in recent years. However, each of those solutions suffers from one or more serious disadvantages, and none of the previously known solutions adequately address the full extent of the abovementioned challenges. It would be helpful to provide a brief overview below of the various types of such attempted, but ultimately commercially unsuccessful solutions.

First, by way of example, referring to the U.S. Pat. No. 6,863,220, entitled "Manually Operated Switch For Enabling and Disabling an RFID Card", and to the U.S. Patent Application, Pub. No. 2007/0290051, entitled "Contactless Card With Membrane Switch Made of Elasto-Resistive Material", both references propose RDS devices that are based on complex on/off RFID/contactless card switches that utilize mechanical parts and/or that incorporate special contact-based materials in their construction, and that are, as a result, more difficult to fabricate. These devices also position a close-range or high frequency antenna between the respective RFID microchip and switch contactor. The complexities in their construction and implementation, also render such switches overly sensitive to disturbances to the RDS device in which they are incorporated.

Referring now to U.S. Pat. Nos. 7,277,016 and 7,253,734, both entitled "System and Method For Altering or Disabling RFID Tags", both references propose solutions in which at least a portion of the antenna in the RDS device is physically damaged or otherwise physically compromised or covered sufficiently to: either reduce the interrogation range of the RDS device (i.e., the range at which it can be accessed), or to disable access to the RDS entirely. However, these RDS device may still be subjected to unauthorized interrogation (albeit at a shorter range), and are difficult, if not impossible to re-use.

Various U.S. patents and applications of Mr. Steven M. Colby, such as U.S. Patent Application, Pub. No. US2007/0109101, entitled "Electronically Switchable RFID Tags", show an RFID device with various configurations and different possible positions for a membrane switch. However, the Colby inventions show single-break switches which can leave the electronic data in the tag subject to interrogation with a powerful RF signals, especially in certain frequency bands. Also none of Mr. Colby's patents show or describe any way to permanently change the default mode of operation of the RFID tag from being always active to being always off.

Finally, referring now to U.S. Patent Application, Pub. No. US2008/0084309, entitled "Revealable RFID Devices", this reference proposes the use of conductive material positioned over a part of the RFID device antenna, or that completely covers the entire RFID device (rendering it effectively inoperable) until it is removed, thus "revealing" the device. Thus, while this reference may provide a solution for keeping the RDS device inoperable until a certain event, it prevents the disclosed RFID tag from being used in an entire range of applications in which it is necessary to use the RDS device until a certain event occurs—not only the other way around. For example, during multiple key stages of their production and distribution, products supplied with the above-described RFID tag would be of no use—they are fabricated, stored, and then transported from a manufacturer to a retailer, all without being able to the RFID tag to for tracking/management purposes tracking until conductive material is removed from the tag, revealing its antenna, and thus undesirably bringing all of the above-described access vulnerabilities and security flaws into play.

It would thus be desirable to provide an advantageous RDS device apparatus that may be implemented as a resonant tag, card, and/or embedded element, capable of user-selectable operation in one of a plurality of security modes, wherein in a first plural security mode the RDS device would be responsive to predetermined electromagnetic or magnetic interrogation thereof, and wherein in a second plural security mode the RDS device would be unresponsive to any interrogation. It would also be desirable to provide a RDS device apparatus that is operable to be selectively placed in an "Always-ON" security mode in which it is freely accessible until switched, by a user, to an "Always-OFF" security mode in which the RDS device is no longer accessible. It would furthermore be desirable to provide a RDS device apparatus with a security mode control that is operable by the user to selectively and temporarily switch the RDS device from an "Always-OFF" security mode in which the device is not accessible to a "temporary on" security mode which allows the RDS device to be accessed as long as the user continues to engage the security mode control, and that automatically returns the RDS device to its "Always-OFF" security mode when the user releases the control. It would moreover be desirable to provide a RDS device apparatus with a security mode and other controls that are operable by the user to selectively and temporarily switch the RDS device between multiple security modes and that is capable of selectively utilizing at least one selected antenna for allowing data access thereto in accordance with one or more active security modes thereof. It would additionally be desirable to provide a RDS device apparatus having a security mode control that is easy and inexpensive to fabricate, that is readily accessible to, and operable by, the user, that is reliable, and that does not damage the RDS device in which it is implemented after repeated use.

It would furthermore be desirable to provide a RDS device apparatus operable to perform multiple additional functions, and supplied with additional capabilities.

BRIEF DESCRIPTION OF THE DRAWINGS

In the drawings, wherein like reference characters denote corresponding or similar elements throughout the various figures.

SUMMARY OF THE INVENTION

Figure 1:
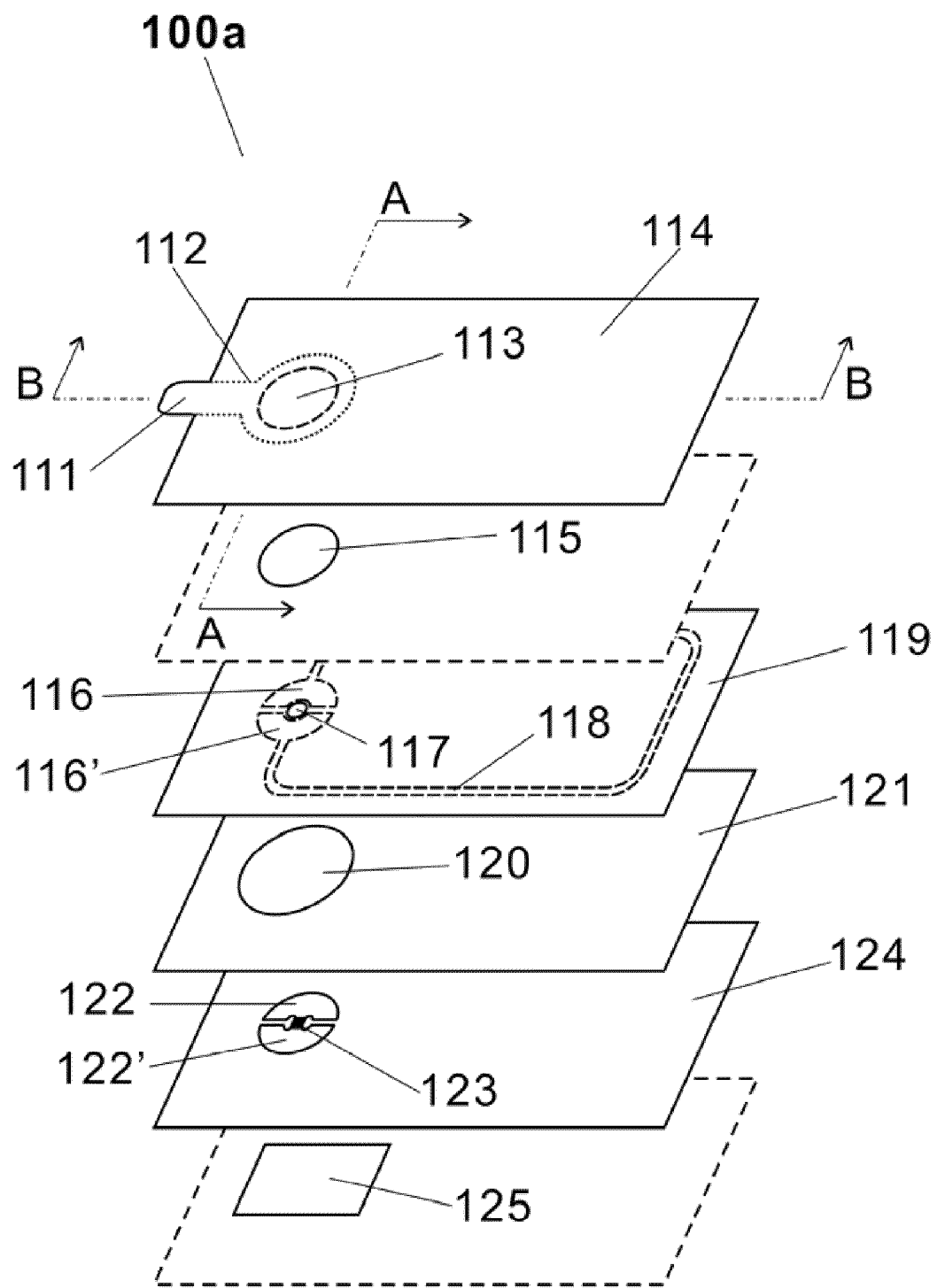
FIG. 1 is an exploded perspective view of a novel switchable security mode RDS device of a first exemplary embodiment of the present invention, in which the security mode switching is accomplished though a membrane switch (hereinafter the "MSRDS element")

The apparatus and method of the present invention address and resolve all of the disadvantages and laws of the previously known attempted solutions, and provide heretofore unavailable functionality, by advantageously providing a novel resonant data storage (RDS) device that may be implemented as an electromagnetically and/or magnetically resonant tag, card, and/or embedded element (or equivalent), that is capable of user-selectable operation in one of a plurality of security modes, wherein in a first plural security mode, the inventive RDS device is responsive to predetermined electromagnetic or magnetic interrogation thereof, and wherein in a second plural security mode, the inventive RDS device is unresponsive to any interrogation. In accordance with the present invention, the novel RDS device apparatus is also operable to be selectively locked in an "Always-ON" security mode in which it is freely accessible until switched (for example, by a user (such as a consumer purchasing a RDS tagged product)), to an "Always-OFF" security mode in which the RDS device is no longer accessible by interrogation.

Advantageously, the membrane switches utilized in various embodiments of the present invention comprise integrated "double break" functionality to ensure complete two-way disconnection of the antenna from the data-storing electronic component in the Always-OFF security mode.

Furthermore, various embodiments of the inventive RDS device may provide additional advantageous features thereto, including, but not being limited to, at least a portion of the following:

(1) utilization of a disposable retaining element configured for easy removal by a user (such as a consumer purchasing a product supplied with the inventive RDS device) to permanently change the RDS device from an Always-ON security mode (which, for example, is very useful for product manufacturers, distributors, and retailers, for example, throughout a supply chain), to a user-operated Always-OFF security mode;

(2) provision of multiple membrane switches sharing the RDS device antenna component, but capable of performing different functions in response to selective operation thereof;

(3) provision of multiple membrane switches, each operable to selectively activate a corresponding different RDS device antenna component;

(4) provision of multiple membrane switches, each operable to selectively provide access to a different set of data (i.e., secure information) stored in one or more electronic components in the RDS device, such that in an Always-OFF security mode the user can choose which switch to activate (and therefore choose which set of data to make accessible to a reader device); and/or (5) one or more releasable retention components, corresponding to one or more of the membrane switches, to readily enable selective switching back and forth between "Always-ON" and "Always-OFF" security modes through selective retention of one or more membrane switches of a RDS device in an activated position (and/or selective release of at least one membrane switch therefrom).

The RDS device apparatus and method of the present invention are advantageously provided with a security mode control that is operable by the user to selectively and temporarily switch the RDS device from an "Always-OFF" security mode, in which the device is not accessible, to a "temporary on" security mode, which allows the novel RDS device to be accessed as long as the user continues to engage the security mode control, and that automatically returns the RDS device to its "Always-OFF" security mode when the user releases the control. If the RDS device security mode control is provided with an aforementioned releasable retention component, the retention component is operable to enable a user to selectively switch the RDS device between "Always-ON" and "Always-OFF" security modes, and in one embodiment thereof, to lock the retention component in one desired (e.g., "retaining" or "released") position on the RDS device.

In one exemplary embodiment thereof, the security mode control of the inventive RDS device comprises a novel membrane switch component for enabling a user to selectively enable and/or disable interrogatory access to the data stored in the RDS device (for example in one or more electronic components, such as a microchip), to protect the RDS device from unauthorized interrogation thereof (e.g., to improperly access the stored data), and therefore the inventive RDS component incorporating at least one such novel switch shall hereinafter be referred to as the "Membrane Switch RDS" element, or "MSRDS element". As is noted above, the inventive MSRDS element security mode control may also optionally include at least one releasable retention component (that, by way of example, may be of a clip-, swivel-, or slide-type or equivalent thereof, or that may be configured as a single use (e.g., "discard after removal"), or a re-insertable pressure layer retention component), that is selectively operable to maintain the MSRDS element in a predetermined desired security mode (i.e., Always-ON or Always-OFF).

In one exemplary embodiment thereof, the inventive MSRDS element comprises a top circuitry layer, a bottom circuitry layer, which includes one or more electronic components, such as a microchip (or equivalent circuitry), a plurality of contact pads and at least one antenna, an insulation spacer layer, a removable (and optionally re-insertable) pressure layer retention component, and an optional EM (Electromagnetic), or EMI (Electromagnetic Interference) shielding layer. In at least one embodiment of the present invention, in which the MSRDS element is "active", or "powered", the MSDRS element also comprises a power supply layer (such as a battery), and/or a component for enabling connection thereof to an external power source.

In various additional embodiments thereof, the MSRDS element layer(s) may also optionally include plural membrane switches coupled with a single antenna component, or with corresponding plural antenna components, and may also include plural selectively operable releasable retention components for utilization therewith.

The membrane switch of the present invention may be formed, by way of example, through a combination of aligned and configured subcomponents of at least a portion of a MSDRS element's layers. In one embodiment thereof, a pressure layer retention component positioned within the MSRDS element is advantageously utilized to maintain the membrane switch in a pressed down position and thereby enable the data stored in the MSRDS element to be accessible continuously (i.e., keeping the MSRDS element in the Always-ON security mode), until such time that the pressure layer retention component is removed.

In this exemplary embodiment of the MSRDS element, which may be readily used in conjunction with a product associated therewith, when a consumer purchases a product that has been provided with the MSRDS element (which has been associated therewith), the consumer removes (e.g., peels off, pulls out, etc.) the pressure layer retention component, to change the MSRDS element from a previous Always-ON security mode, to an Always-OFF security mode, such that the data stored in the MSRDS element is thereafter accessible, through electromagnetic or magnetic interrogation thereof (i.e., placed into an "on" security mode), but only for as long as the membrane switch is held down by the consumer.

Therefore, the MSRDS element of the present invention provides a greater level of data security than previously known solutions, but is also advantageously balanced with convenience—the inventive MSRDS element is freely accessible prior to acquisition of the product associated therewith by a user, and is thereafter easily made secure by the user, who is provided with the capability of readily and selectively enabling access to the data stored therein by operating the MSRDS element's security mode control. Optionally, the pressure layer retention component may be re-insertable by the user, such that if the user desires to return the MSRDS element to an Always-ON security mode, they may do so by returning the pressure layer retention component to its previous position within the MSRDS element in which it exerts continual pressure on the membrane switch.

Also, as is noted above, in alternate embodiments of the inventive MSRDS element, rather than relying on utilization of a pressure layer retention component, one or more appropriate user-operable releasable retention components of a variety of different embodiments and/or configurations, may be advantageously utilized to achieve selective switching between the Always-ON and Always-OFF security modes.

Furthermore, unlike previously known solutions, which rely on single-break switch to disconnect antenna from RDS card or tag circuitry, making them vulnerable to electromagnetic leakage, and/or influence, when subjected to high power, and/or ultra high frequency, interrogation signals, various embodiments of the inventive MSRDS element comprise a double-break switch configuration to ensure complete disconnection of the antenna(s) from the electronic component(s) containing the information. Additionally, alternate embodiments of the MSRDS element provide antenna disconnection switching within the main electronic component thereof (microchip, etc.), in addition to, or instead of, antenna disconnect switching outside the electronic component.

The layer-based construction of the novel MSRDS element, and its membrane-based security mode control embodiments, enable easy and inexpensive fabrication of the MSRDS element, makes it readily accessible to, and operable by, the user, and further increases the MSRDS element reliability by providing at least one security mode control thereto, that does not damage the MSRDS element in which it is implemented, even after repeated utilization. One or more optional EM/EMI shielding layer may also be provided for protecting the electronic component(s) of the MSRDS element from undesirable electromagnetic influence, and to prevent various contact pads in the MSRDS element from acting as antennae susceptible to unauthorized interrogation.

It should also be noted that various embodiments of the apparatus and method of the present invention, may be advantageously utilized in conjunction with the novel systems and methods disclosed in the U.S. patent application entitled "SYSTEM AND METHOD FOR STREAMLINED REGISTRATION OF ELECTRONIC PRODUCTS OVER A COMMUNICATION NETWORK AND FOR VERIFICATION AND MANAGEMENT OF INFORMATION RELATED THERETO" (Ser. No. 12/325,152) (inventor Yu Yung Choi), which is hereby incorporated herein in its entirety (and which is hereinafter referred to as "the '152 patent application"). For example, the various embodiments of the inventive MSRDS element may be readily utilized in conjunction with various embodiments of the unique ID (UID) integrated and/or embedded component(s) of FIGS. 1A to 2B of the '152 patent application. Specifically, the inventive MSRDS element is particularly suited for advantageous use as the user-controlled UID component of FIG. 2B. In addition, the user-controlled UID component of FIG. 2B of the '152 patent application comprises and illustrates an inventive double break switch 60a (shown by way of a circuit symbol) that is designed and configured to be operable to disconnect both of the circuits between the UID component 68 and the antenna 56a, as shown in the FIG. 2B of the '152 patent application. Furthermore, the capability of the inventive MSRDS element to enable the user to selectively control its security mode, coupled with its retention component embodiments which enable the inventive MSRDS element to essentially function as a conventional Always-ON RDS device, until its retention component is released (e.g., by removing a pressure plate retention component from the MSRDS element, etc.), likewise make it an excellent choice for supporting implementation of the novel processes of FIGS. 5 to 8 of the '152 patent application. In addition, in the inventive embodiments of the novel MSRDS element which are supplied with multiple membrane switches, the user's ability to utilize the MSRDS element in conjunction with various online features such as Internet-based product registration, verification, and/or product ownership-related transactions, is further enhanced.

In essence, in various above-described embodiments thereof, structurally the MSRDS element of the present invention comprises a top and bottom circuitry layer. The circuitry preferably includes an electronic component operable to store and/or to process data (such as an IC microchip, or equivalent), contact pads, an antenna component; an insulation spacer layer, an optional pressure layer retention component, a button (e.g., placed within the region of the membrane switch) layer, and an optional EM/EMI shielding layer. An adhesive, or other technique for keeping the various appropriate portions of the layers affixed to one another, may be readily utilized. In operation thereof, pressure applied to the top "button" portion of the membrane switch layer deflects the top contact pads through the spacer layer, resulting in mechanical and electrical contact with bottom contact pads.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The apparatus of the present invention are directed to a selectively accessible electromagnetically resonant data storage element (that may be implemented as a resonant tag, card, and/or embedded element integrated into a product), that is selectively responsive to predetermined electromagnetic interrogation thereof, that comprises a novel membrane switch component for enabling a user to selectively enable and/or disable interrogatory access to the resonant component, to protect from unauthorized interrogation thereof (hereinafter "MSRDS element").

In summary, the inventive MSRDS element comprises a top circuitry layer, a bottom circuitry layer, which includes a microchip, a plurality of contact pads and an antenna, an insulation spacer layer, a pressure layer retention component, and an optional EM/EMI shielding layer. The membrane switch may be formed through a combination of aligned and configured subcomponents of at least a portion of the element's layers. In one embodiment thereof, the pressure layer retention component may be advantageously utilized to maintain the membrane switch in a pressed down position to thereby enable the MSRDS element to function continuously (i.e., keeping it in an Always-ON security mode), until such time that the pressure layer retention component is removed.

In this exemplary embodiment of the RDS device, for example used in conjunction with consumer products, when a consumer purchases a product that has been provided with the MSRDS element, they remove (e.g., pull out, etc.) the pressure layer retention component to change the element from the previous Always-ON security mode to an Always-OFF security mode, such that the MSRDS element is only accessible to electromagnetic interrogation thereof, when the membrane switch is held down by the user. Therefore, the RDS device of the present invention provides a greater level of data security advantageously balanced with convenience—the inventive MSRDS element is freely accessible prior to acquisition thereof by a user, and is thereafter easily made secure by the user, who is provided with the capability of readily and selectively enabling access to the data stored therein.

Advantageously, the membrane switch(es) utilized in various embodiments of the present invention comprise integrated "double break" functionality to ensure complete two-way disconnection of the antenna from the data-storing electronic component in the Always-OFF security mode (See FIGS. 1-15, 21-22, 29-32, and accompanying description).

Figure 30:
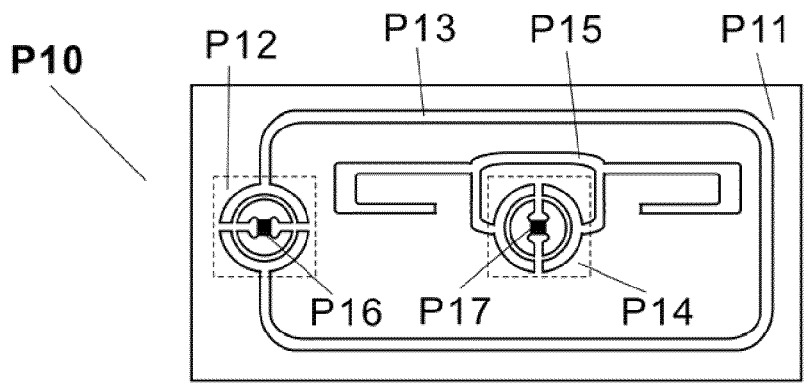
FIG. 30 is a plan view of a second exemplary embodiment membrane switch layer of an alternate embodiment of the inventive MSRDS element, having two separate membrane switches, each connected to a separate different antenna component, with the membrane switches being selectively operable to selectively control (or otherwise utilize) at least one of the two different antennas in the same MSRDS element.
Figure 32:
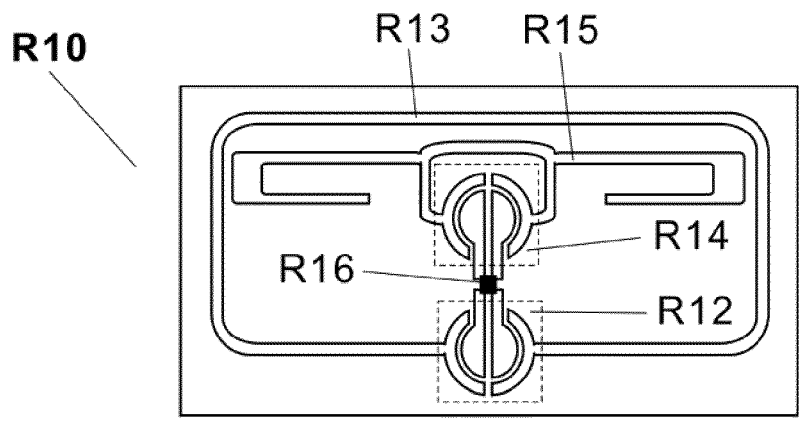
FIG. 32 is a plan view of a fourth exemplary embodiment of a membrane switch layer of an alternate embodiment of the inventive MSRDS element, having two separate exemplary membrane switches, each connected to at least one electronic component (e.g., a microchip), each capable of selectively accessing different features of the at least one electronic component in response to selective operation thereof, wherein the membrane switches are selectively operable to selectively control (or otherwise utilize) at least one of the two different antennas in the same MSRDS element.

In various embodiments of the present invention, the novel MSDS element is provided with additional functions and capabilities enabling its utilization in a wide variety of applications other than storage of electronic data, including, but not being limited to, at least a portion of the following:

(1) utilization of a disposable pressure layer retention component configured for easy removal by a user (such as a consumer purchasing a product supplied with the inventive RDS device) to permanently change the RDS device from an Always-ON security mode (which, for example, is very useful for product manufacturers, distributors, and retailers, for example, throughout a supply chain), to a user-operated Always-OFF security mode (See FIGS. 1-11 and accompanying descriptions);

(2) provision of multiple membrane switches sharing the RDS device antenna component, but capable of performing different functions in response to selective operation thereof (See FIGS. 29-33 and accompanying descriptions);

(3) provision of multiple membrane switches, each operable to selectively activate a corresponding different RDS device antenna component (See FIGS. 30, 32, and accompanying descriptions);

(4) provision of multiple membrane switches, each operable to selectively provide access to a different set of data (i.e., secure information) stored in one or more electronic components in the RDS device, such that in an Always-OFF security mode the user can choose which switch to activate (and therefore choose which set of data to make accessible to a reader device) (See FIGS. 29-33, and accompanying descriptions); and/or (5) one or more releasable retention components, corresponding to one or more of the membrane switch(es), to readily enable selective switching back and forth between "Always-ON" and "Always-OFF" security modes through selective retention of one or more membrane switch(es) of a RDS device in an activated position (and/or selective release of at least one membrane switch therefrom) (See FIGS. 23-28, 33, and accompanying descriptions).

Prior to describing various embodiments of the present invention in greater detail it should be noted that in all embodiments of the present invention, various electronic components capable of storing secure data (and/or of performing other functions) are referred to as "microchip(s)" for the sake of convenience, and by way of example only. It should be understood to one skilled in the art that any electronic component with functionality equivalent to that of an integrated circuit microchip or microchip may be readily utilized in various embodiments of the present invention as a matter of design choice or convenience without departing from the spirit of the invention. Similarly, with respect to references herein to various sub-elements of a microchip (such as pins, contact pads, etc.) are by way of example only—it should be understood by one skilled in the art that if an electronic component other than a microchip is utilized in an MSRDS element, the sub-elements with equivalent functionality to contact pads, pins, etc. may be readily utilized without departing from the spirit of the invention.

It should also be noted, that while the inventive MSRDS element is shown and described in various embodiments herein as being a multi-layer tag or card, the novel MSRDS element may also be integrated partially or entirely into a product to provide electromagnetically resonant secure data storage capabilities with user controlled changeable security modes. In embodiments of the present invention with multiple membrane switches, one or more product functions may advantageously be operated from one or more of the membrane switch(es). In such integrated configurations, the novel MSRDS element may not necessarily be formed from the specific aligned layers shown in various figures herein, as long as the membrane switch(es) and at least one releasable retention component is provided therefor.

Additionally, it should be noted that a generally rectangular shape of the various embodiments of the novel MSRDS element of the present invention is shown in various figures by way of example only, and is not intended as a limitation on the size and shape thereof. Therefore, the MSRDS element may be readily sized and shaped as a matter of design choice without departing from the spirit of the invention. For example, the MSRDS element may be square, circular, oval, or any other geometric shape, and/or it may range in size from a small postage stamp to a large document.

Figure 2:
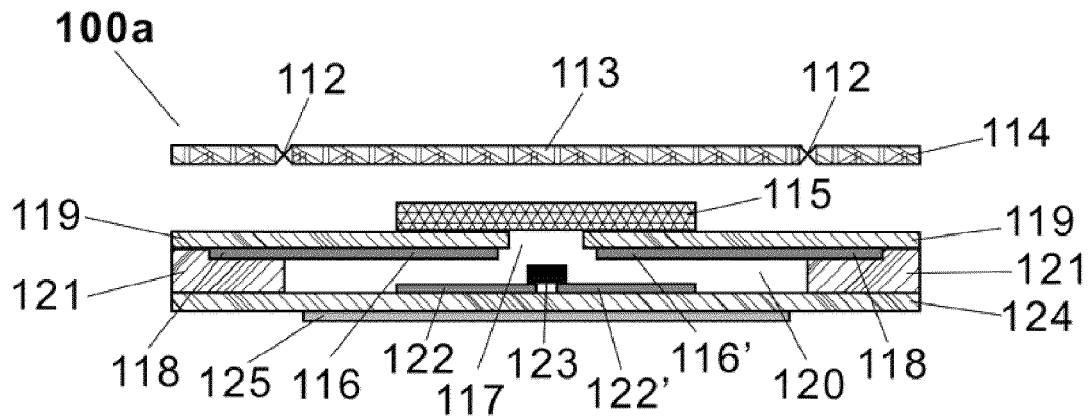
FIG. 2 is a cross-sectional view of the MSRDS element of FIG. 1, taken from line A-A of FIG. 1, prior to an application of the pressure layer retention component thereto.
Figure 3:
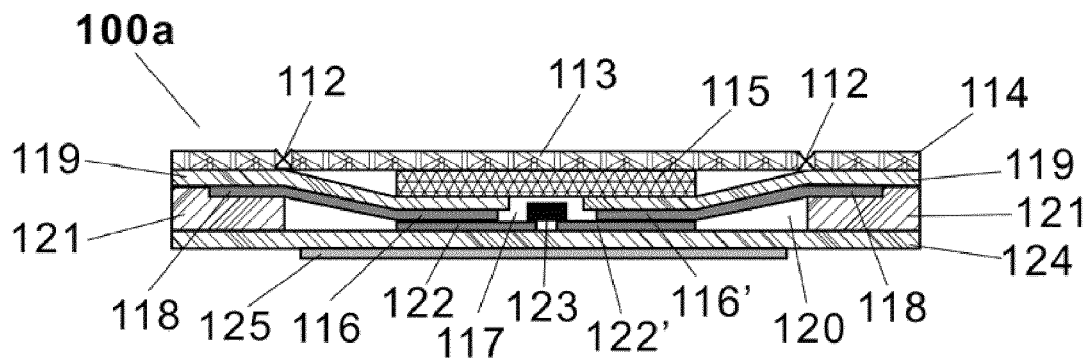
FIG. 3 is a cross-sectional view of the MSRDS element of FIG. 1, taken from line A-A of FIG. 1, after the pressure layer retention component of FIG. 2 is applied therein.
Figure 4:
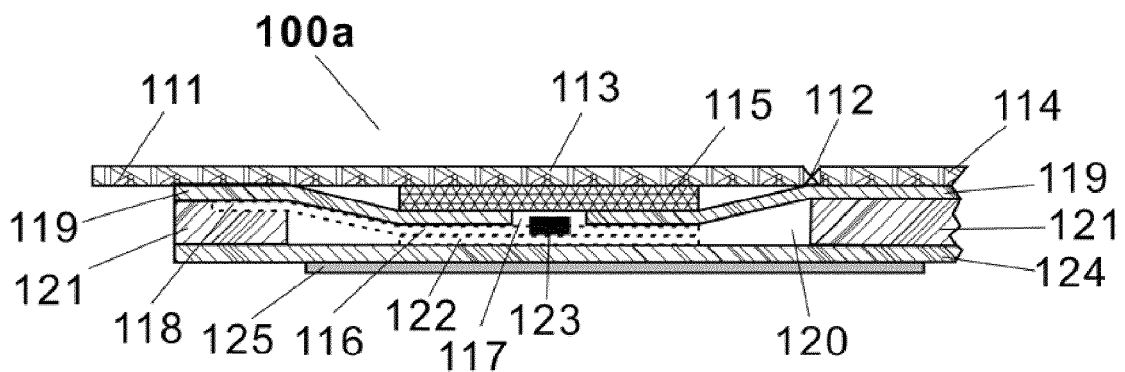
FIG. 4 is a cross-sectional view of the MSRDS element of FIG. 1, taken from line B-B of FIG. 1, after the pressure layer retention component of FIG. 2 is applied therein.
Figure 12:
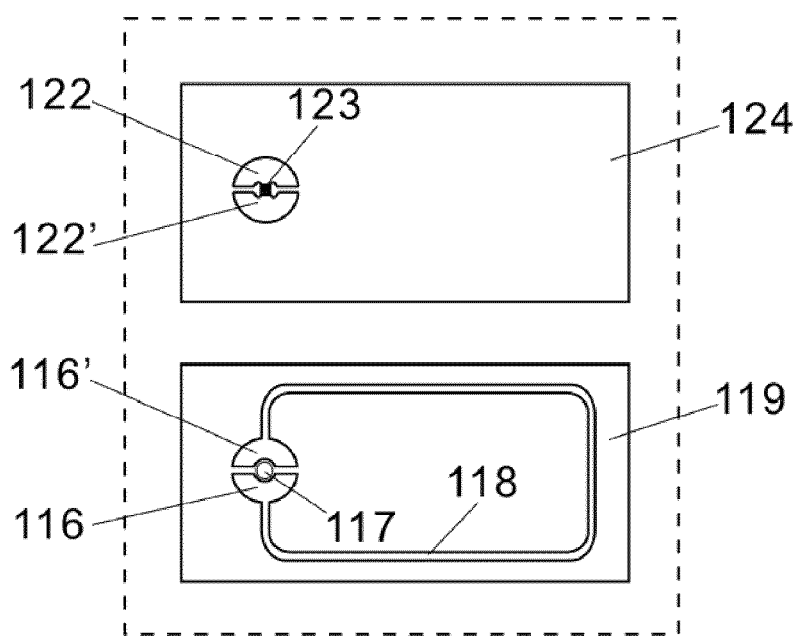
FIG. 12 is a plan view of the top and the bottom layers of the MSRDS element of FIG. 1, with the top layer being illustrated in an orientation that is inverted from the position in which it would be placed when the MSRDS element is assembled.

Referring now to FIGS. 1-4, and 12, a first exemplary embodiment of the inventive MSRDS element is shown as MSRDS element 100a in an exploded perspective view in FIG. 1, in various cross-section views in FIGS. 2-4, and in a partial plan view in FIG. 12.

The MSRDS element 100a comprises at least three layers: a top layer 119, a bottom layer 124, and an insulation spacer layer 121, a microchip 123 operable for storing data (and/or for performing other functions), and an antenna 118 (which may be of any shape, size, or configuration selected as a matter of design choice and/or desired operational parameters (frequency band, etc.), such as dipole antenna; multiple loop antenna, etc.). The bottom-surface of the top layer 119 and the top-surface of the bottom layer 124 preferably form conductive circuits such as an antenna 118 having antenna contact pads 116, and 116' on one surface, and microchip contact pads 122, 122', connected to microchip 123 antenna pins on another surface, with each set of pads positioned in proximal facing alignment to one another. The antenna 118 and various contact pads 116, 122, etc. may formed by being printed, etched, through film deposition, etc., utilizing a conductive material.

In one inventive configuration of the MSRDS element 100a, shown by way of example in the FIGS. 1-4 and 12, the microchip 123 comprises two antenna pins (not shown) that are preferably separately bonded in a circuit with two microchip contact pads 122 and 122' on the bottom layer 124 of the MSRDS element 100a switching area (defined as the region in which the contact pad sets 116, 116' and 122, 122' positioned to be operable to achieve contact with one another). The antenna contact pads 116 and 116' are positioned on the top layer 119 of the switching area, and are separately connected with the antenna 118. The spacer layer 121, positioned between the top layer 119 and bottom layer 124, comprises a switching hole 120 aligned with the switching area. Furthermore a microchip housing region 117, for receiving and housing the microchip 123 therein, is defined and positioned between the antenna contact pads 116 and 116'. In an alternate embodiment of the present invention (not shown), at least one of the sets of contact pads 116, 116' and/or 122, 122' may be composed of a conductive material thicker or equal to that of the microchip 123—in this configuration it is not necessary to define the separate microchip housing region 117 in the switching area.

Thus, in the switching area of the MSRDS element 100a there are four contact pads (116, 116', 122, 122') in two different circuits. Advantageously, the positioning of the contact pads coupled with the utilization of two different circuits provides double break switch functionality to the MSRDS element 100a. In operation of the MSRDS element 100a, when pressure is applied on top layer 119 in the switching area, the antenna contact pads 116 and 116' contact with microchip contact pads 122 and 122' on the bottom layer 124, closing the two separate circuits into one, and connecting the microchip 123 to the antenna 118, causing the microchip 123 to be accessible for interrogation by a corresponding reader device. An optional EM/EMI shielding layer 125 may also be provided to protect the microchip 123 of the MSRDS element 100a from undesirable electromagnetic influence, and to prevent microchip contact pads 122, 122' from acting as antennae susceptible to unauthorized interrogation.

Referring now to FIG. 12, a plan view of the top layer 119 and bottom layer 124, of the MSRDS element 100a of FIG. 1 is shown. The top layer 119 is illustrated in an inverted position, and the microchip 123 and the antenna 118 are configured such that they are positioned on different layers of the MSRDS element 100a, with the microchip 123 shown as being connected to the circuitry of the microchip contact pads 122 and 122' in the switching area.

Preferably, a button layer 115 is provided and positioned above the top layer 119 being sized and configured to be smaller than the switching area—in one inventive embodiment, the button layer 115 may be integrated into the top-surface of the top layer 119. For example, the button layer 115 may be just a small circular element positioned above the antenna contact pads 116, 116'. Optionally, the button layer 115 may comprise one or more EM/EMI shielding materials to provide protection to the microchip 123.

Preferably, a pressure layer retention component 114 is positioned above the top layer 119. The pressure layer retention component 114 includes a press element 113 positioned and configured to press down on the button layer 115 causing it to bring the antenna contact pads 116 and 116' on top layer 119 into electrical contact with the microchip contact pads 122 and 122' on bottom layer 124. Thus unless the press element 113 is blocked (as described below) from pressing down on the button layer 115, its action by default presses down on the button layer 115, causing the MSRDS element 100a to stay in an Always-ON security mode.

In this first embodiment of the present invention, by way of example, the pressure layer retention component 114 also includes a retention element 112 comprising a user-operable pull tab 111 that is positioned and configured to release the pressure of the press element 113 on the button layer 115 when it is removed from the MSRDS element 100a (for example by pulling, or peeling off the retention element 112 by the pull tab 111).

As is shown in FIGS. 2 to 4, the various components of the MSRDS element 100a in the switching area (e.g., portions of top layer 119, button layer 115, and, in certain configurations of the pressure layer retention component 114, the press element 113) together form a membrane switch.

Advantageously, the pressure layer retention component 114 may be configured in a variety of ways. For example, it may be "use-once-only" (i.e., disposable), such that after the retention element 112 is removed (e.g., by a user pulling it out or peeling it off), the press element 113 is permanently disengaged from constantly pressing on the button layer 115, such that thereafter the MSRDS element 100a remains in an Always-OFF user-operable security mode. In this configuration, if the various MSRDS element 100a layers are connected to one another through an adhesive, then the region between the pressure layer retention component 114 and the bottom region of the removable press element 113 should be kept adhesive-free.

The size and shape of the retention element 112 may be selected as a matter of design choice without departing from the spirit of the invention (as long as the size and shape of the retention element 112 are sufficient to keep the press element 113 engaged with the button layer 115, prior to removal thereof). Thus, for example, the retention element 112 may be sized comparably with press element 113 and positioned in substantial alignment and proximity therewith, or the retention element 112 may be larger, and may even be sized and configured as the entire pressure layer retention component 114.

Alternately, the pressure layer retention component 114 may be configured as being re-usable, such that the retention element 112 (or the entire pressure layer retention component 114) may be removable by the user to release the button layer 115 and place the MSRDS element 100a into an Always-OFF security mode, and may thereafter be replaced (e.g., re-inserted) by the user, to resume constant pressure on the button layer 115 to thus return the MSRDS element 100a into a default Always-ON security mode.

It should be understood that various alternate configurations of the components of the MSRDS element 100a are contemplated by the present invention. For example:

(1) Optionally, the press element 113 may be a component of the retention element 112;
(2) Optionally the button layer 115 may be formed on the bottom-surface of the pressure layer retention component 114 and sized smaller than the switching area;
(3) Optionally, the press element 113 may be configured as a concave region in the pressure layer retention component 114, such that until the retention element 112 (or the entire pressure layer retention component 114) is removed, the concave region keeps the button layer 115 in a depressed position and maintains the MSRDS element 100a in the Always-ON security mode; and/or
(4) Optionally, the MSRDS element 100a may also include an EM/EMI shielding layer 125, under the bottom layer 124 and/or over the top layer 119, positioned to cover the region in which the microchip 123 is housed, as well as microchip contact pads 122, 122' (or optionally, in addition to covering these regions, also covering other regions of the MSRDS element 100a, except the region in which the antenna 118 is disposed). The EM/EMI shielding layer 125 may be formed as a separate applied film and/or printed on one or more of the MSRDS element 100a layers. The EM/EMI shielding layer 125 advantageously prevents the microchip contact pads 122, 122' from essentially functioning as antennae themselves and thus undesirably enabling remote access to the microchip 123.

In addition to the various advantages shown and described above, the inventive MSRDS element 100a also includes advantages of membrane switches, such as high reliability, long life, low cost, resistance to undesirable contamination and/or to wear (i.e., membrane switches are typically dust proof, water proof, rust proof, etc.).

Figure 5:
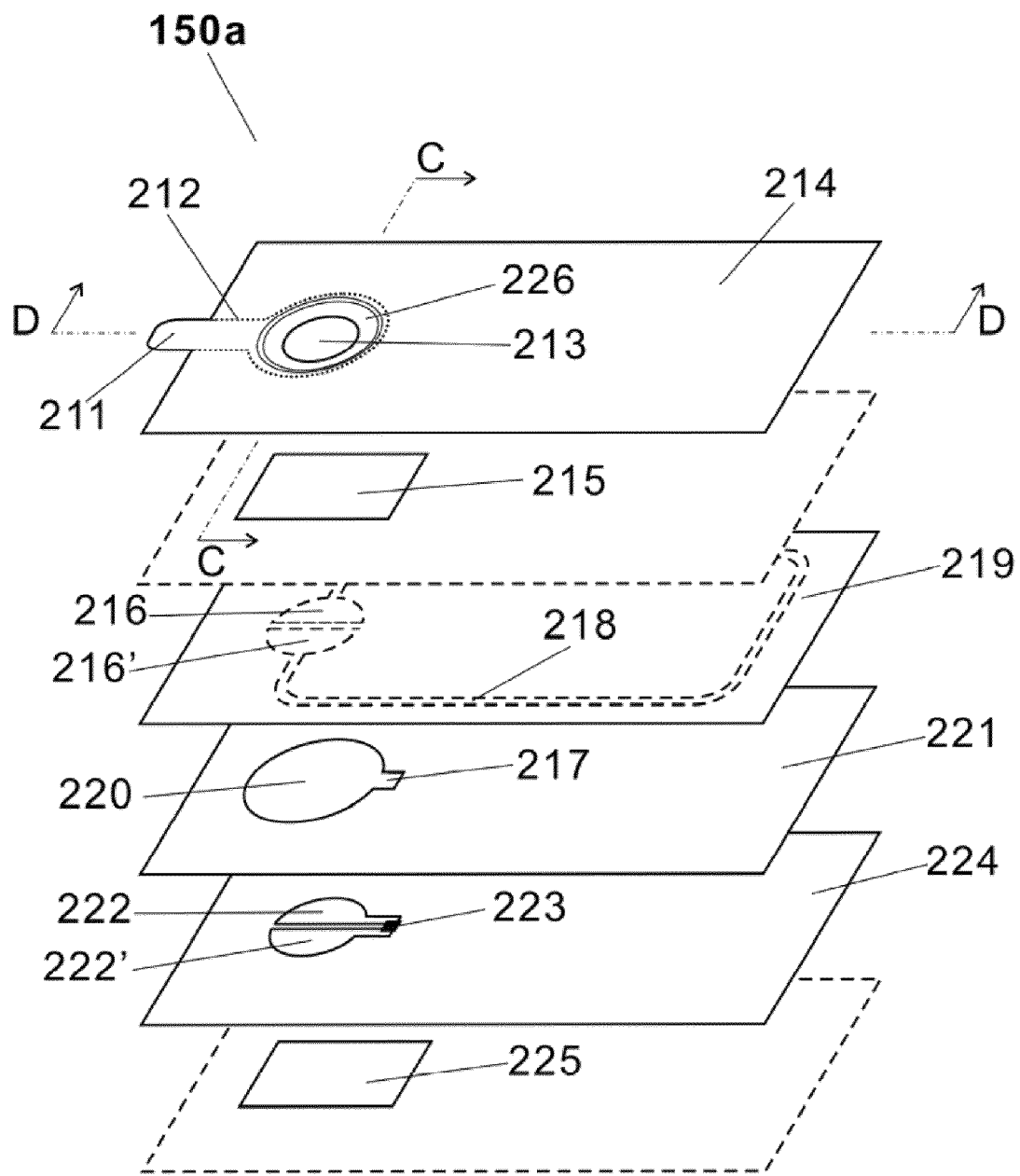
FIG. 5 is an exploded perspective view of a MSRDS element of a second exemplary embodiment of the present invention.
Figure 6:
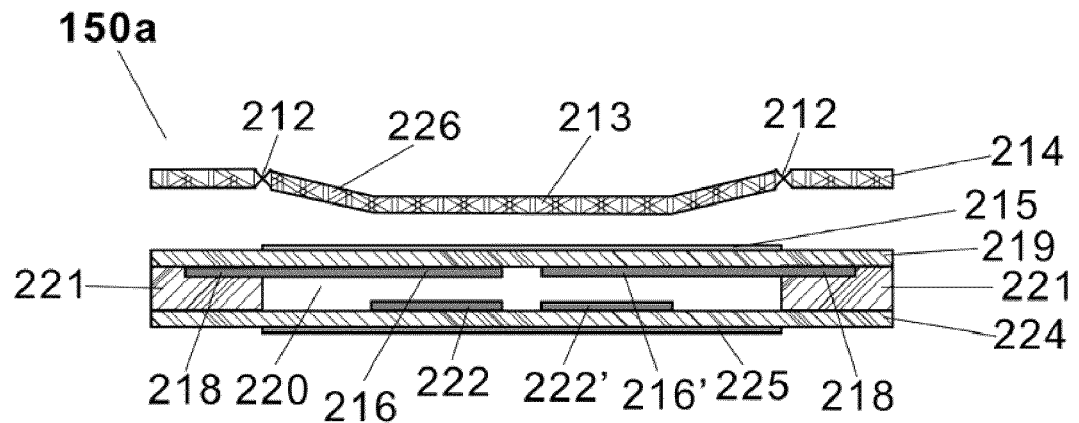
FIG. 6 is a cross-sectional view of the MSRDS element of FIG. 5, taken from line C-C of FIG. 5, prior to an application of the pressure layer retention component thereto.
Figure 7:
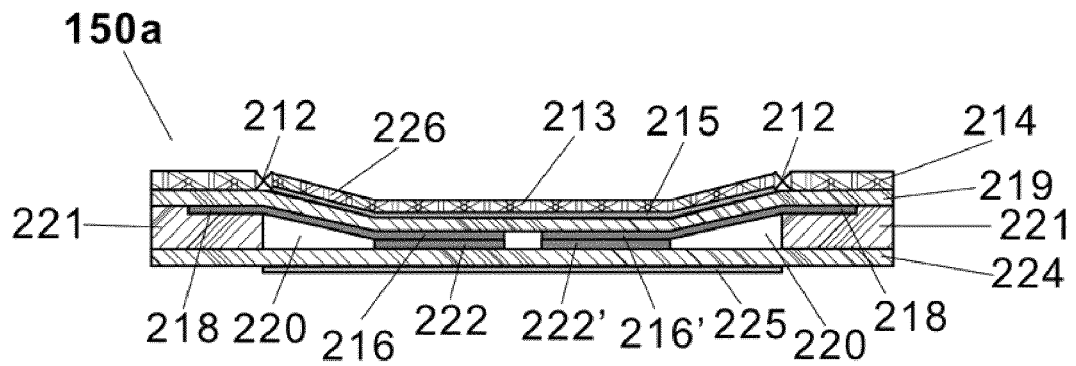
FIG. 7 is a cross-sectional view of the MSRDS element of FIG. 5, taken from line C-C of FIG. 5, after the application of the pressure layer retention component thereto.
Figure 8:
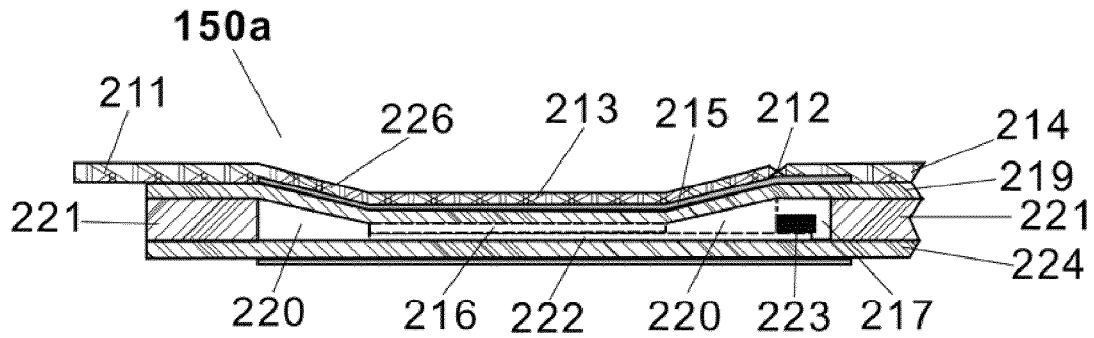
FIG. 8 is a cross-sectional view of the MSRDS element of FIG. 5, taken from line D-D of FIG. 5 of MSRDS element after the pressure layer retention component is applied therein.
Figure 13:
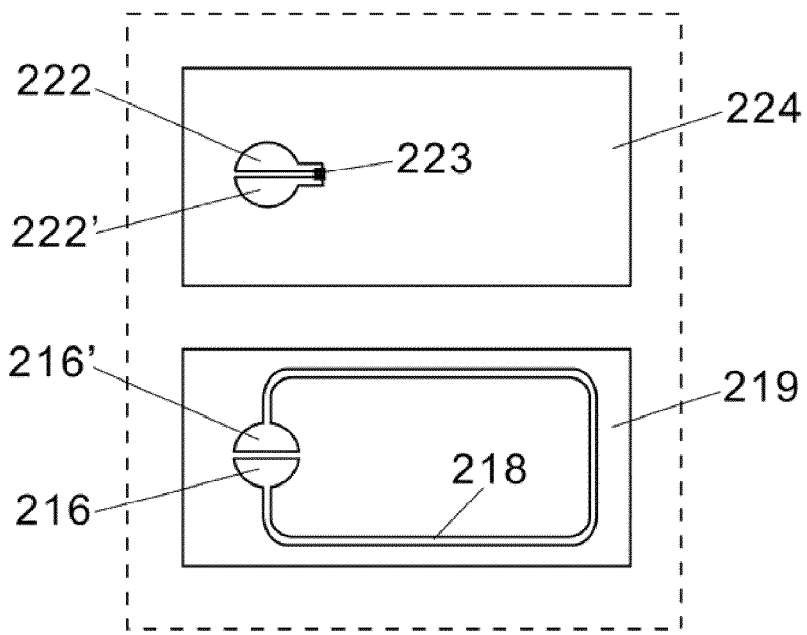
FIG. 13 is a plan view of the top and the bottom layers of the MSRDS element of FIG. 5, with the top layer being illustrated in an orientation that is inverted from the position in which it would be placed when the MSRDS element is assembled.

Referring now to FIGS. 5-8, and 13, a second exemplary embodiment of the inventive MSRDS element is shown as MSRDS element 150a in an exploded perspective view in FIG. 5, in various cross-section views in FIGS. 6-8, and in a partial plan view in FIG. 13. The MSRDS element 150a comprises at least three layers: a top layer 219, a bottom layer 224, and an insulation spacer layer 221, and also includes a microchip 223 operable for storing data (and/or for performing other functions). The microchip 223 includes two circuit connections (such as through pins, contacts, or equivalent) to a pair of corresponding microchip contact pads 222 and 222' positioned on the top-surface of the bottom layer 224 in a switching area (i.e., vertically aligned with other switch-related subcomponents of the MSRDS element 150a). The MSRDS element 150a also includes an antenna 218 (which may be of any shape, size, or configuration selected as a matter of design choice and/or desired operational parameters (frequency band, etc.), such as dipole antenna; multiple loop antenna, etc.), that is connected with a pair of antenna contact pads 216 and 216' positioned on the bottom-surface of the switching area of the top layer 219.

Optionally an EM/EMI shielding layer 215 may be provided and positioned on the top layer 219 in the switching area, and/or optionally, an EM/EMI shielding layer 225 may be provided and/or positioned under the bottom layer 224 in the switching area. The EM/EMI shielding layers 215, 225 may each be formed as a separate applied film and/or printed on one or more of the MSRDS element 150a layers. The EM/EMI shielding layers 215, 225 advantageously prevent the microchip contact pads 222, 222' from essentially functioning as antennae themselves and thus undesirably enabling remote access to the microchip 223.

Preferably, a spacer layer 221 is provided and positioned between the top layer 219 and bottom layer 224, and comprises a switch opening 220 defined in a region thereof corresponding to the switching area, and also includes a microchip housing region 217 that may be optionally defined as a part of, or proximal to, the switch opening 220. The microchip housing region 217 is preferably sized and configured to receive and retain the microchip 223 therein. Advantageously, when pressure is applied to the switching area of the top layer 219, the antenna contact pads 216 and 216' are brought into electrical contact with the microchip contact pads 222 and 222' on the bottom layer 224. In an alternate embodiment of the present invention, the housing region 217 may be sized, shaped, and configured to complement and/or to form an extension of the switch opening 220, such that it can provide additional "storage space" for other needs, such as storing the compressed air that may forced through the switch opening 220 when the switching area is pressed down therethrough and thus alleviating the resulting air pressure. Therefore, advantageously, the housing region 217 may be positioned, sized, and configured based on the design needs or convenience without departing from the spirit of the invention. Furthermore, in an alternate embodiment of the invention, additional housing regions (not shown), that may be similar to, or different from, the housing region 217, may be provided in the MSRDS element 150a, as a matter of design choice or convenience without departing from the spirit of the invention.

Preferably, a pressure layer retention component 214 is positioned above the top layer 219. The pressure layer retention component 214 includes a concave portion 226 and a press element 213 positioned in the switching region and configured to press down on the EM/EMI shielding layer 215 and the top layer 219, thereby causing the antenna contact pads 216 and 216' into electrical contact with the microchip contact pads 222 and 222' on bottom layer 224. In that configuration, which maintains the connection between the microchip 223 and the antenna 218, the MSRDS element 150a is set to a default Always-ON security mode.

The pressure layer retention component 214 is also preferably comprises a retention element 212 comprising a user-operable pull tab 211 that is positioned and configured to release the pressure of the press element 213 on the EM/EMI shielding layer 215 (and thus on the antenna contact pads 216, 216'), when the retention element is removed from the MSRDS element 150a (for example by pulling, or peeling off the retention element 212 by the pull tab 211).

Advantageously, the pressure layer retention component 214 may be configured in a variety of ways. For example, it may be "use-once-only" (i.e., disposable), such that after the retention element 212 is removed (e.g., by a user pulling it out or peeling it off), the press element 213 is permanently disengaged from constantly pressing on the EM/EMI shielding layer 215, such that thereafter the MSRDS element 150a remains in an Always-OFF user-operable security mode. In this configuration, if the various MSRDS element 150a layers are connected to one another through an adhesive, then the region between the pressure layer retention component 214 and the bottom region of the removable press element 213 should be kept adhesive-free.

The size and shape of the retention element 212 may be selected as a matter of design choice without departing from the spirit of the invention (as long as the size and shape of the retention element 212 are sufficient to keep the concave portion 226 and the press element 213 engaged with the EM/EMI shielding layer 215, prior to removal thereof). Thus, for example, the retention element 212 may be sized comparably with the concave portion 226 and the press element 213, and positioned in substantial alignment and proximity therewith, or the retention element 212 may be larger, and may even be sized and configured as the entire pressure layer retention component 214.

Alternately, the pressure layer retention component 214 may be configured as being re-usable, such that the retention element 212 (or the entire pressure layer retention component 214): (1) may be removable by the user to release the EM/EMI shielding layer 215, and to therefore place the MSRDS element 150a into an Always-OFF security mode, and (2) may thereafter be replaced (e.g., re-inserted) by the user, to resume constant pressure on the EM/EMI shielding layer 215, to thus return the MSRDS element 150a into a default Always-ON security mode.

Figure 9:
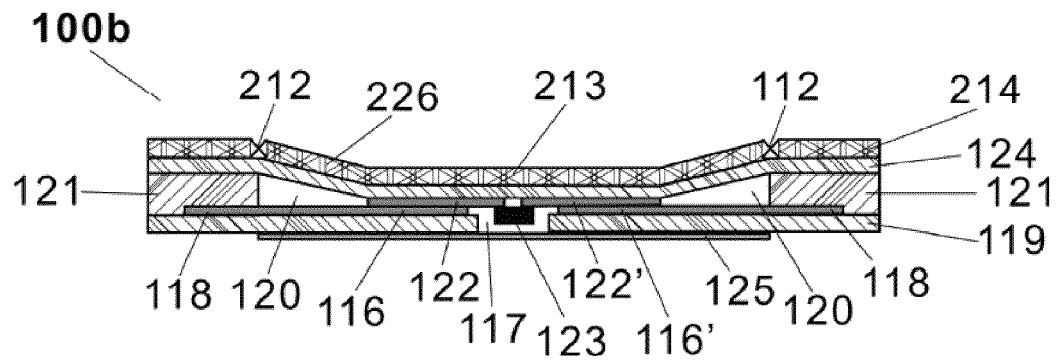
FIG. 9 is a cross-sectional view of an alternate embodiment of the present invention that may be used in connection with the MSRDS element of FIG. 1 after the pressure layer retention component is applied therein (with the view being taken from line A-A in such a case), or that may be used in connection with the MSRDS element of FIG. 5 after the pressure layer retention component is applied therein (with the view being taken from line C-C in this case)

Referring now to FIG. 9, an alternate exemplary embodiment of the MSRDS element 100a of FIGS. 1, 3 (after the pressure layer retention component is applied therein (with the view being taken from line A-A in such a case)), or of MSRDS element 150a of FIGS. 5, 7 after the pressure layer retention component is applied therein (with the view being taken from line C-C in such a case)), is shown as a MSRDS element 100b in a cross-sectional view. The MSRDS element 100b is configured in a similar manner to corresponding MSRDS element 100a of FIG. 1, except that the positions of the top layer 124 and the bottom layer 119 are reversed. Accordingly, this exemplary embodiment of the inventive MSRDS elements (e.g. 100a, 150a, and 100b), illustrates that various subcomponents thereof may be switched in position without departing from the spirit of the invention.

Figure 10:
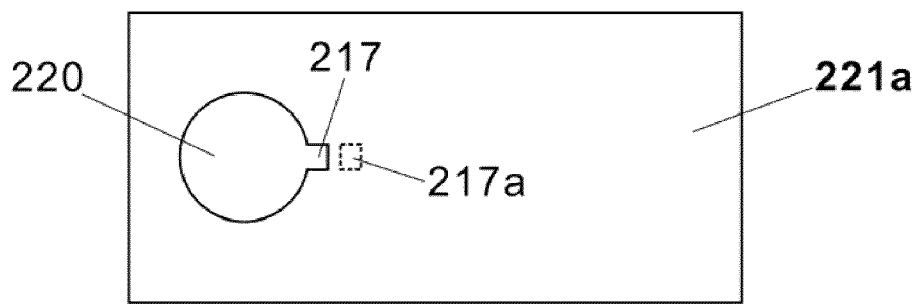
FIG. 10 is a plan view of an alternate embodiment of a spacer layer of the MSRDS element of FIG. 5.

Referring now to FIG. 10, an alternate exemplary embodiment of a spacer layer 221, that may be readily and advantageously utilized in conjunction with an exemplary novel MSRDS element 150a of FIG. 5, is shown as a spacer layer 221a in a plan view. The spacer layer 221a comprises an alternate microchip housing region 217a positioned separately from, but proximal to, the switch opening 220, and that is preferably sized and configured to receive and retain the microchip 223 therein.

Figure 11:
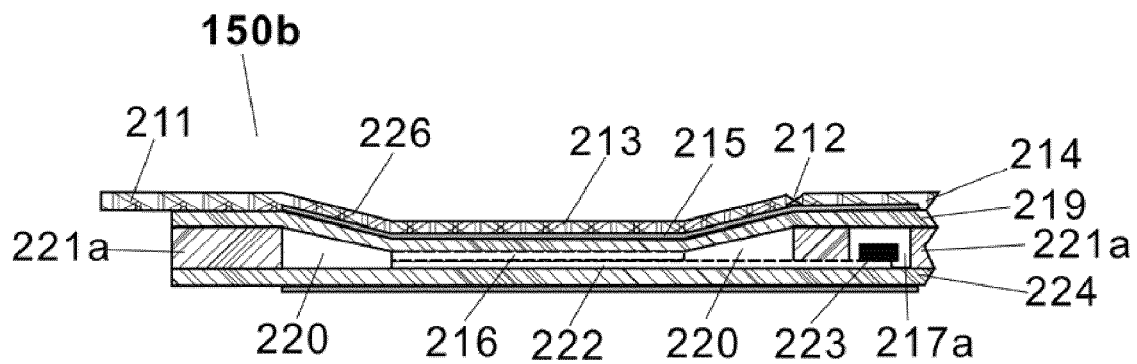
FIG. 11 is a cross-sectional view of an alternate embodiment of the MSRDS element of FIG. 5, taken from line D-D of FIG. 5 of MSRDS element after the pressure layer retention component is applied therein.

Referring now to FIG. 11, an alternate exemplary embodiment of the MSRDS element 150a of FIG. 5 (after the pressure layer retention component is applied therein (with the view being taken from line D-D of FIG. 5)), and which utilizes the spacing layer 221a, is shown as a MSRDS element 150b in a cross-sectional view. The MSRDS element 150b is configured in a similar manner to corresponding MSRDS element 150a of FIG. 5, except that the microchip 223 is housed in a microchip housing region 217a that is proximal to, but separate from the switch opening 220.

Referring now to FIG. 13, a plan view of the top layer 219 and bottom layer 224, of the MSRDS element 150a of FIG. 5 is shown. The top layer 219 is illustrated in an inverted position, and the microchip 223 and the antenna 218 are configured such that they are positioned on different layers of the MSRDS element 150a, with the microchip 223 shown as being positioned outside the switching area but connected to the circuitry of the microchip contact pads 222 and 222' that are positioned in the switching area.

Figure 14:
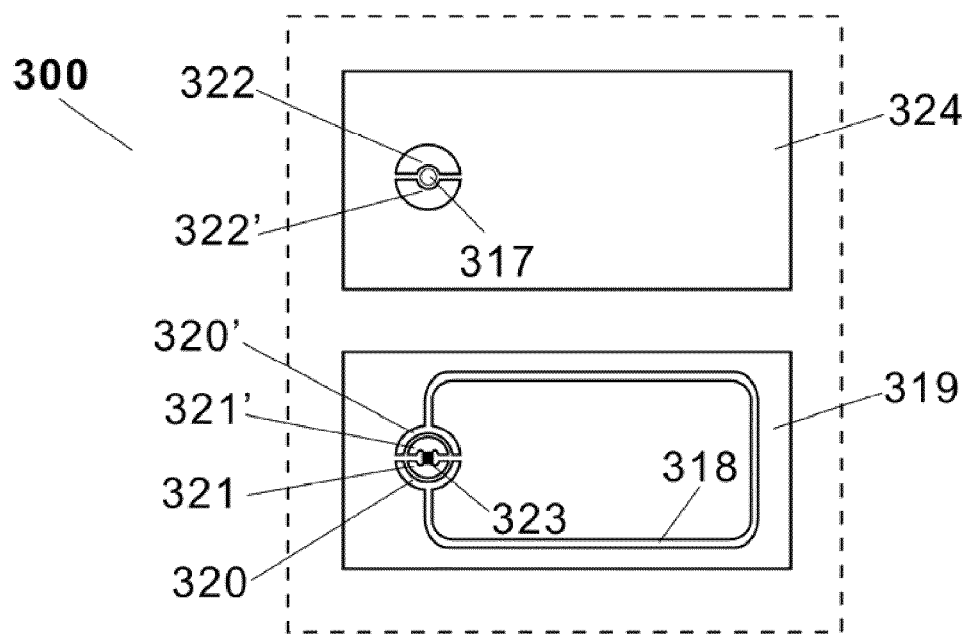
FIG. 14 is a plan view of alternate embodiments of the top and bottom layers shown in FIG. 12.

Referring now to FIG. 14, an alternate exemplary embodiment of the set of the top layer 119 and bottom layer 124 of FIG. 12, that may be readily and advantageously utilized in conjunction with an exemplary novel MSRDS element 100a of FIG. 1, is shown as a top/bottom layer set 300 in a plan view. The layer set 300 includes a top layer 319 and a bottom layer 324, but unlike the top and bottom layers 119, 124, respectively of FIG. 12, a microchip 323 and an antenna 318 are on the same layer—the top layer 319. The microchip 323 is connected via circuitry to microchip contact pads 321 and 321' positioned in the switching area. The antenna 318 includes antenna contact pads 320, 320' that are positioned proximal to the microchip contact pads 321, 321'. The bottom layer 324 comprises contact pads 322 and 322', that are sized, configured and positioned so that each essentially forms a "bridge" between each corresponding proximal pair of antenna/microchip contact pads—i.e., when the top and bottom layers 319, 324 are brought into contact with one another and pressure is applied to the region containing the bridge contact pads 322, 322', the antenna contact pad 320 is bridged and electrically connected to the proximal microchip contact pad 321, while the antenna contact pad 320' is bridged and electrically connected to the proximal microchip contact pad 321'. A microchip housing region 317, sized and configured to receive and retain the microchip 323 therein, is preferably positioned between the bridge contact pads 322 and 322'. Accordingly in this inventive embodiment there are six contact pads operable to connect two different circuits are positioned in the switching area.

Figure 15:
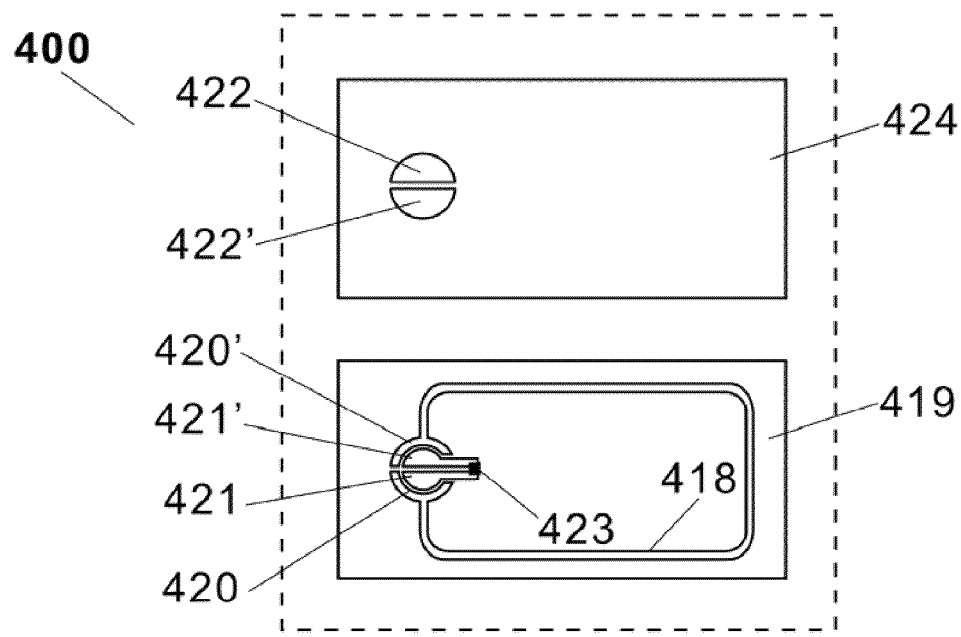
FIG. 15 is a plan view of alternate embodiments of the top and bottom layers shown in FIG. 13.

Referring now to FIG. 15, an alternate exemplary embodiment of the set of the top layer 219 and bottom layer 224 of FIG. 13, that may be readily and advantageously utilized in conjunction with an exemplary novel MSRDS element 150a of FIG. 5, is shown as a top/bottom layer set 400 in a plan view. The layer set 400 includes a top layer 419 and a bottom layer 424, but unlike the top and bottom layers 219, 224, respectively of FIG. 13, a microchip 423 and an antenna 418 are on the same layer—the top layer 419. The microchip 423 is positioned proximal to, but not within the switching area and is connected via circuitry to microchip contact pads 421 and 421' that are positioned in the switching area. The antenna 418 includes antenna contact pads 420, 420' that are positioned proximal to the microchip contact pads 421, 421'. The bottom layer 424 comprises contact pads 422 and 422', that are sized, configured and positioned so that each essentially forms a "bridge" between each corresponding proximal pair of antenna/microchip contact pads—i.e., when the top and bottom layers 419, 424 are brought into contact with one another and pressure is applied to the region containing the bridge contact pads 422, 422', the antenna contact pad 420 is bridged and electrically connected to the proximal microchip contact pad 421, while the antenna contact pad 420' is bridged and electrically connected to the proximal microchip contact pad 421'. Accordingly in this inventive embodiment there are six contact pads operable to connect two different circuits are positioned in the switching area.

Figure 16:
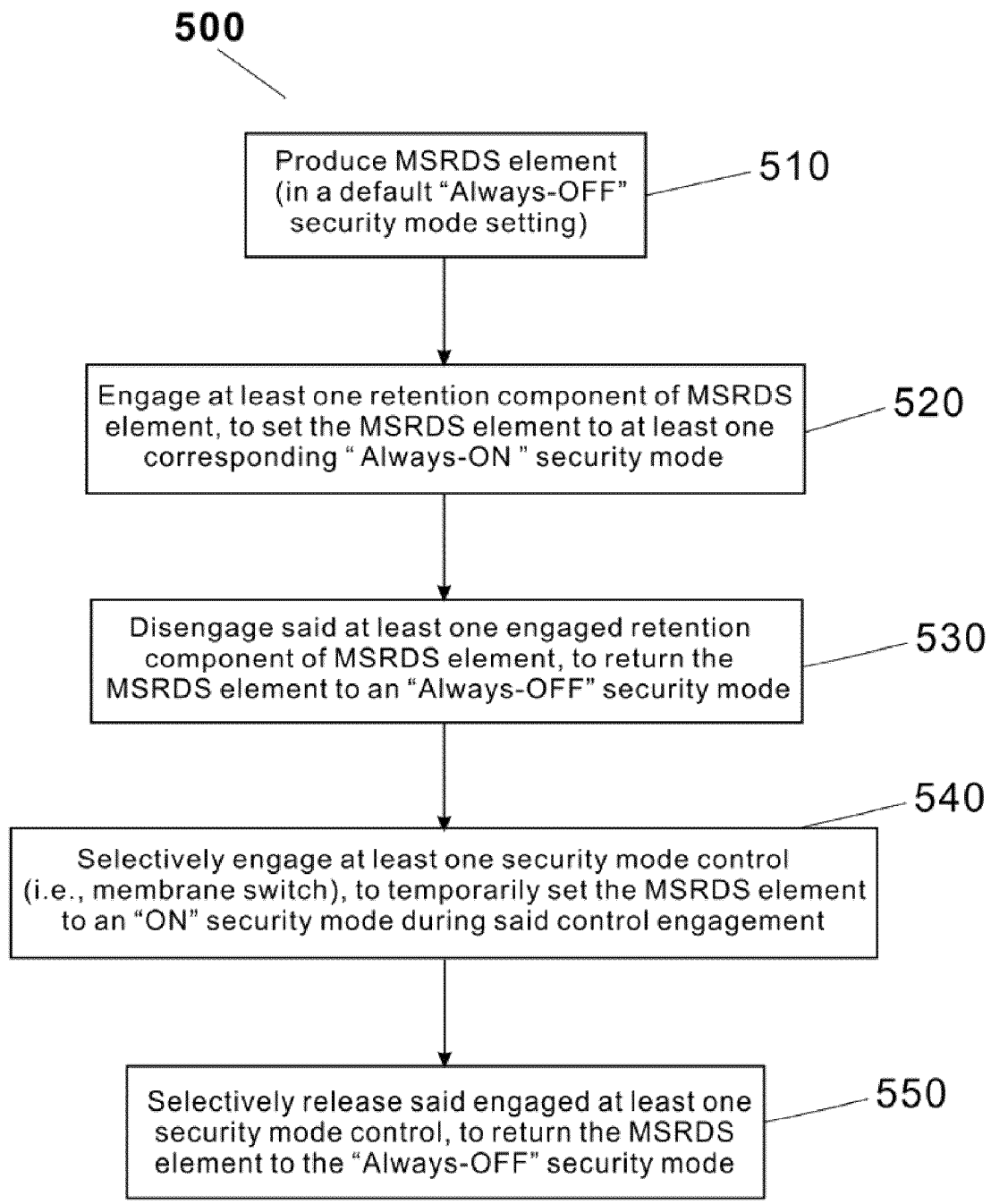
FIG. 16 is a process flow diagram that shows an exemplary embodiment of an inventive process of selectively applying, and thereafter removing, a pressure layer retention component in the inventive MSRDS element embodiments of FIGS. 1 and/or 5.

Referring now to FIG. 16, an exemplary embodiment of an inventive process of producing, configuring, and operating (in various security modes), various embodiments of the inventive MSRDS element (such as the MSRDS elements 100a and 150a of FIGS. 1, 5, respectively), is shown as a process 500, illustrated as a process flow diagram, with selectively performable steps 510 to 550. At a first step 510, an inventive MSRDS element is produced. The process of MSRDS element production may be implemented utilizing any of a variety of solutions and/or techniques, including, but not limited to:

1) manufacturing at least two layers for a MSRDS element,
2) providing a button layer for the MSRDS element,
3) providing at least one shielding layer for the MSRDS element,
4) provide at least one retention component for selectively maintaining the MSRDS element in a default Always-ON security mode, etc.

In essence, the various embodiments of the inventive MSRDS element may be readily fabricated utilizing any of a variety of thin device membrane switch fabrication techniques and solutions, such as stamping, printing, layering films, or a combination thereof, etc. The inventive MSRDS element may be initially fabricated in an Always-OFF default security mode setting and supplied to initial customers in such a state.

At a step 520, which may be performed for each MSRDS element by product manufacturers wishing to use the inventive MSRDS elements with their products, at least one retention component of each MSRDS element is engaged to connect at least one microchip (or an equivalent electronic component operable to store data therein) to at least one corresponding MSRDS element antenna to allow wireless access (read, write, etc.) to data stored therein and/or to stored MSRDS element settings, and to therefore set the MSRDS element to a default corresponding Always-ON security mode. In this mode, novel MSRDS elements can desirably behave as conventional industrial logistics EM resonant tags that can be readily read, tracked, and inventoried as products to which they are assigned move through commerce (e.g., from manufacturers, to distributors, to retailers, for example, throughout a supply chain).

At a step 530, which may be selectively performed, at some time period after step 520, by a consumer purchasing, from a retailer, a product supplied with a novel MSRDS element in an Always-ON security mode, the at least one engaged retention component of the product's MSRDS element is disengaged to return the MSRDS element to an Always-OFF security mode. As discussed above in connection with FIGS. 1 and 5, the at least one engaged retention component may be single use and disposable, in which case, once it is disengaged, the MSRDS element will be substantially permanently set into the default Always-OFF security mode, or it may be releasable and user-operated, as described above in connection with FIGS. 1 and 5, and as further described below in connection with FIGS. 23-28.

At steps 540 and 550, which may be selectively performed, at some time period after step 530, by the consumer who purchased the product supplied with the novel MSRDS element, set to the Always-OFF security mode at step 530, when access to the MSRDS element microchip becomes necessary, the user first selectively engages at least one MSRDS element security mode control (e.g., at least one membrane switch) to temporarily set the MSRDS into an ON security mode which is maintained as long as the consumer continues to engage the security mode control (i.e., as long as the membrane switch is kept in a pressed position) for as long as is necessary to access the MSRDS element microchip and perform the desired task(s). When access to the MSRDS element microchip is no longer necessary, at the step 550, the consumer releases the engaged at least one security mode control (e.g., by ceasing pressure on the membrane switch), to thereby return the MSRDS element to its "Always-OFF" default security mode.

Figure 17:
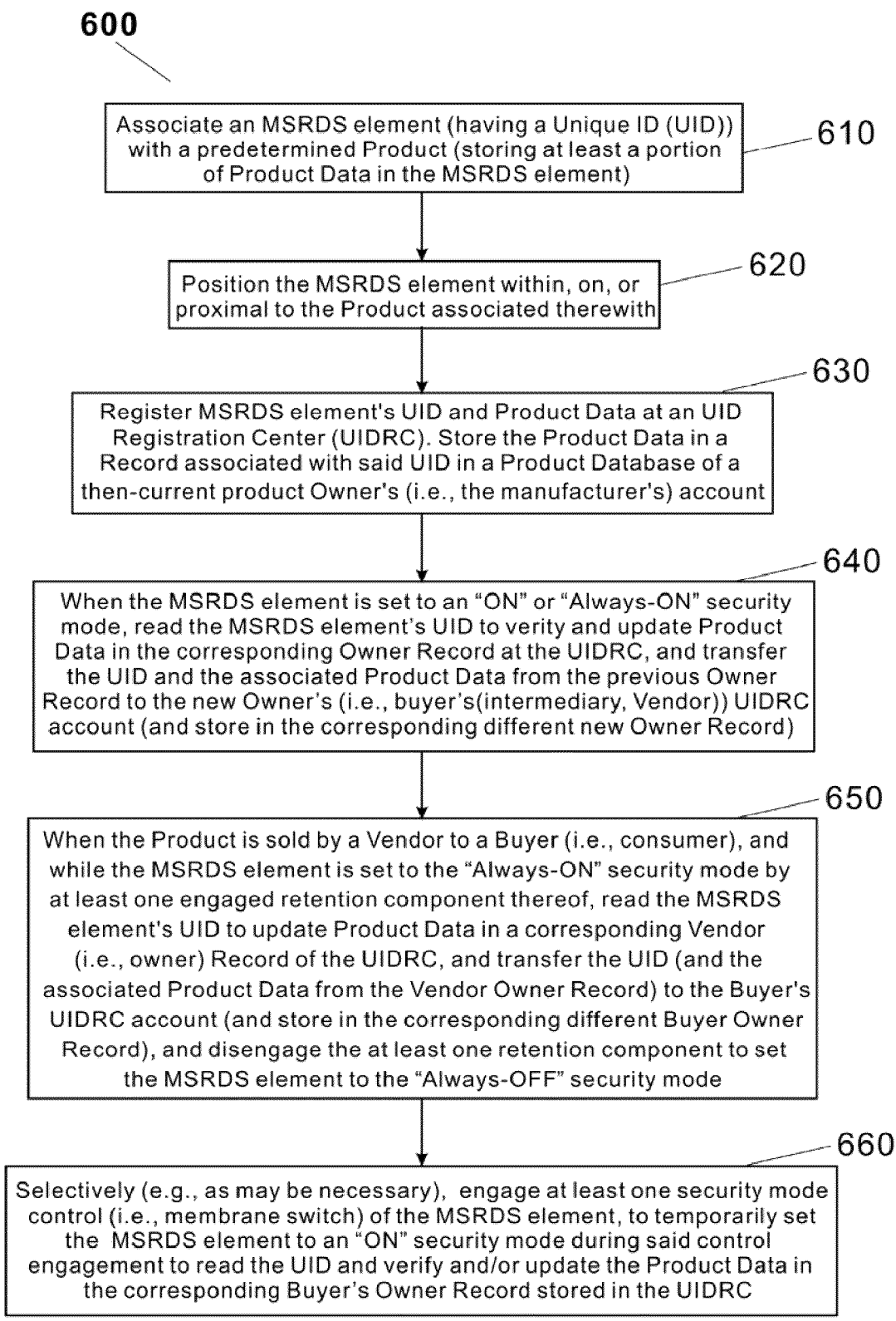
FIG. 17 is a process flow diagram that shows an exemplary embodiment of a process of utilizing an inventive MSRDS element embodiment of FIGS. 1 and/or 5, in conjunction with a product associated therewith, and thereafter retaining the MSRDS element for further use, such as to verify predetermined product-related data after the product associated with the MSRDS element is acquired through a purchase thereof, or when the product ownership otherwise changes.

Referring now to FIG. 17, a process flow diagram is shown, illustrating an exemplary embodiment of a novel process 600 (operable in selectively performable steps 610 to 660) for utilizing an inventive MSRDS element (such as MSRDS elements 100a, 150a, of FIGS. 1 and/or 5, respectively), in conjunction with a product associated therewith, and thereafter retaining the MSRDS element for further use, such as to verify predetermined product-related data after the product associated with the MSRDS element is acquired by a customer through a purchase thereof, or when the product ownership otherwise changes. Various advantageous and novel processes, in addition to the process 600, relating to configuration and/or utilization of at least one novel MSRDS element, are disclosed and described in greater detail in the above-incorporated the '152 patent application. The '152 patent application should also be referenced for a more detailed discussion of the various terms (UID, UIDRC, Record, owner, etc.) utilized below in description of the various steps 610 to 660 of the process 600.

At a step 610, a MSRDS element (having an Unique ID (UID) assigned thereto by an authorized party) is associated with a predetermined corresponding Product (optionally also storing at least a portion of Product Data in the MSRDS element electronic component (e.g., in the microchip)), and, at a step 620, the MSRDS element is positioned within, on, or proximal to the Product associated therewith. At a step 630, the MSRDS element's UID and Product Data are preferably registered at an UID Registration Center (UIDRC), while the Product Data is stored in a Record associated with the MSRDS elements' UID in a Product Database of a then-current product Owner's (i.e., the manufacturer's) account.

At a step 640, when the MSRDS element is set to an ON or Always-ON security mode, the MSRDS element's UID may be read (by interrogating the MSRDS element's microchip(s)) to verify and update Product Data in the corresponding Owner Record at the UIDRC, and optionally the UID and the associated Product Data may be selectively transferred from the previous Owner Record to a new Owner's (i.e., buyer's (intermediary, Vendor)) UIDRC account (and stored in the corresponding different new Owner Record).

At a later time, when the Product is sold by a Vendor to a Buyer (i.e., a consumer), and while the MSRDS element is set to the Always-ON security mode by at least one engaged retention component thereof, at a step 650 the MSRDS element's UID may be read to update Product Data in a corresponding Vendor (i.e., owner) Record of the UIDRC, and to transfer the UID (and the associated Product Data from the Vendor Owner Record) to the Buyer's UIDRC account (and store it in the corresponding different Buyer Owner Record), after which the at least one retention component may be disengaged by Vendor staff (or by the Buyer) at the conclusion of the Product purchase transaction, to set the MSRDS element to the Always-OFF security mode to ensure that the Product information is not accessible without the Buyer's cooperation.

If necessary, at a later time, a step 660 may be selectively performed at which at least one security mode control (i.e., membrane switch) of the MSRDS element is engaged by the Owner to temporarily set the MSRDS element to the ON security mode to read the UID and to verify and/or update the Product Data in the corresponding Buyer's Owner Record stored in the UIDRC, or to perform other operations or tasks involving access to Product and/or ownership data stored in the MSRDS element.

Figure 18:
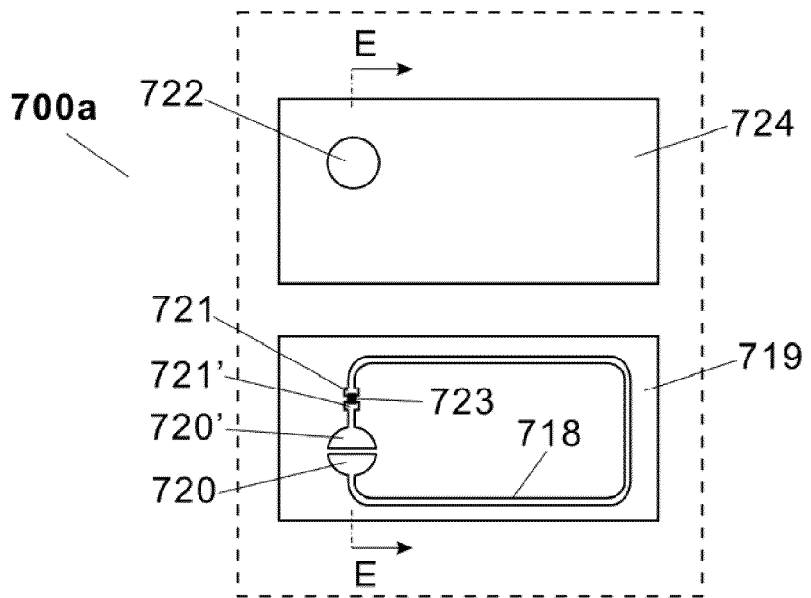
FIG. 18 is a plan view of an alternate embodiment of the present invention showing the top and bottom layers thereof, with the top layer being illustrated in an orientation that is inverted from the position in which it would be placed when the MSRDS element is assembled.
Figure 19:
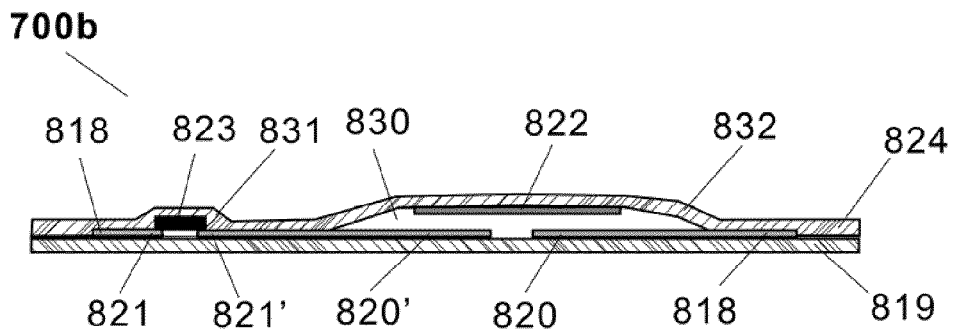
FIG. 19 is a cross-sectional view of the MSRDS element of FIG. 18, taken from line E-E of FIG. 18, showing a raised region disposed on the top layer of the switching area.
Figure 20:
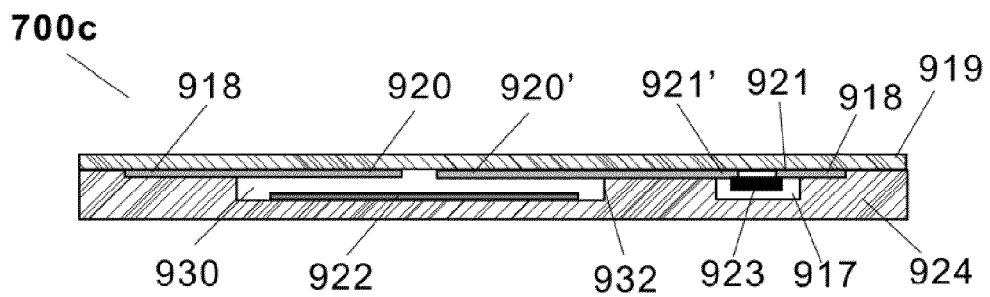
FIG. 20 is a cross-sectional view of the MSRDS element of FIG. 18, taken from line E-E of FIG. 18, showing a concave region disposed on the bottom layer of the switching area, with the top and bottom layers being illustrated in an orientation that is inverted from the positions in which they would be placed when the MSRDS element is assembled.

Referring now to FIGS. 18-20, an alternate exemplary embodiment of the inventive MSRDS element is shown as MSRDS element 700a in a plan view in FIG. 18, and in various cross-section views in FIGS. 19 and 20. The MSRDS element 700a comprises a top layer 724 and a bottom layer 719. A bridge contact pad 722 is positioned in a switching area of the top layer 724, while a microchip 723 bonded between contactors 721 and 721' is positioned on the bottom layer. The contactor 721 is connected to an antenna 718, while the other contactor 721' is connected to the switching contact pad 720' and the next to contact pad 720' is another contact pad 720 connecting to the antenna 718.

In FIG. 19, a cross-sectional view of a MSRDS element, such as element 700a, taken from line E-E of FIG. 18, is shown as a MSRDS element 700b, and illustrates an MSRDS element configuration in which only two layers are used. A top layer 824 comprises a dome-like portion 832 which includes a bridge contact pad 822 therein, and a second dome-like portion 831 comprising housing for a microchip 823. A bottom layer 819 includes contact pads 820 and 820'. The microchip 823 and a set of its two corresponding contactors 821, 821', as well as an antenna 818 are positioned between the top layer 824 and the bottom layer 819, with an additional empty region 830 defined in the switching area between the bridge contact pad 822 and the contact pads 820, 820'.

In FIG. 20, a cross-sectional view of a MSRDS element, such as element 700a, taken from line E-E of FIG. 18, is shown as a MSRDS element 700c, and illustrates an alternate MSRDS element configuration in which only two layers are used (a top layer 919 and a bottom layer 924 are illustrated in inverted positions). The bottom layer 924 includes a concave portion 932 in a switching area, with a bridge contact pad 922 positioned herein. A microchip housing region 917 is likewise defined in the bottom layer 924. Contactors 921 and 921' and a microchip 923 bonded therebetween are positioned under the top layer 919. An antenna 918 is also positioned between the top layer 919 and the bottom layer 924, with contact pads 920, 920' connected thereto. An empty region 930 is defined in the switching area between the bridge contact pad 922 and the contact pads 920, 920'.

Figure 21:
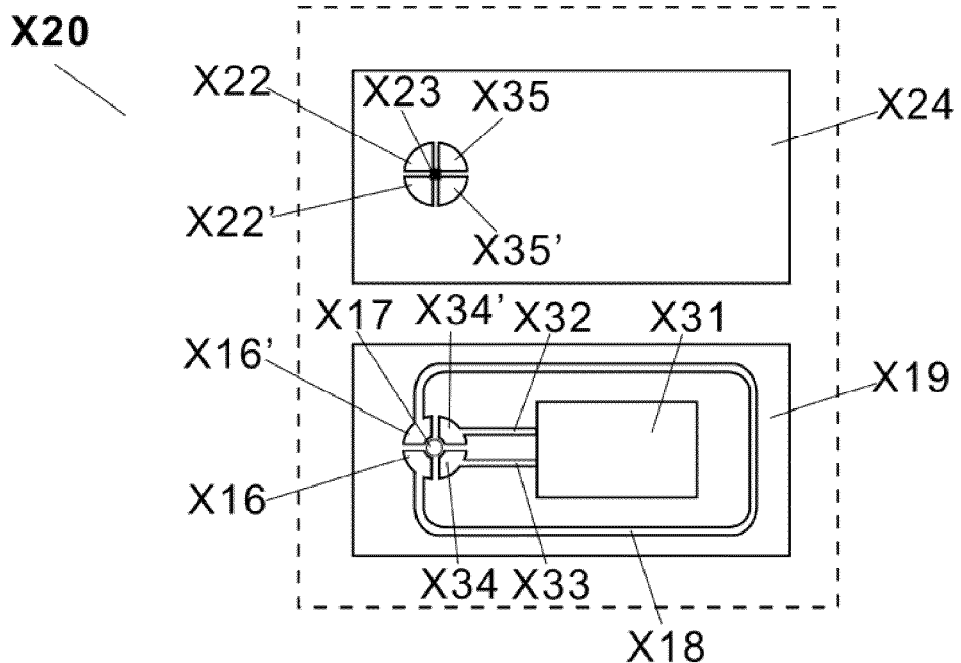
FIG. 21 is a plan view of an alternate embodiment of the MSRDS element of FIG. 12, illustrating a film-type power source between the top and bottom layer thereof.

Referring now to FIG. 21, an alternate exemplary embodiment of subcomponents that may be readily and advantageously utilized in conjunction with various embodiments of the inventive MSRDS elements illustrated in various figures herein and described in connection therewith (such as the MSRDS element 100a of FIGS. 1-4, and 12), is shown as a MSRDS element subcomponent set X20 in a plan view. The subcomponent set X20 can be advantageously utilized in powered (e.g., "active") inventive MSRDS element configurations which require a power source within the element itself. Such a power source may be a film-type (or equivalent) or a smaller type, battery X31 positioned between the a top layer X19 and a bottom layer X24 in a MSRDS element configuration that may be similar to that shown for MSRDS element 100a in the FIG. 12, but with a number of differences as follows:

(1) A microchip X23 is provided, having four pins (not shown) that are connected with two pairs of contact pads: contact pads X22, X22' for an antenna X18, and first set of contact pads X35, X35' for the battery X31, all positioned in a switching area of the bottom layer X24.

(2) The top layer X19 of the switch area also includes two pairs of contact pads: X16, X16' and X34, X34'. The contact pads X16 and X16' are preferably connected to the antenna X18, while the second set of battery contact pads X34 and X34' are connected to the battery X31 through corresponding circuits X32 and X33.

(3) An open microchip housing region X17 for receiving and housing the microchip X23 is also provided.

In operation of a novel MSRDS element supplied with the subcomponent set X20, when pressure is applied to the switching area of the top layer X19, the pair of antenna contact pads X16, X16' is brought into an electrical connection with the contact pads X22, X22', with the second set of battery's contact pads X34, X34', and also achieves electrical connection with the first set of contact pads X35, X35' on the bottom layer X24. Thereby, the microchip X23 receives the needed power from the battery X31 through the circuits X32, X33, and at the same time, the microchip X23 is also connected to the antenna X18 through antenna contact pads X22, X22' and X16, X16' to be able to receive and broadcast radio or EM communication signals.

Figure 22:
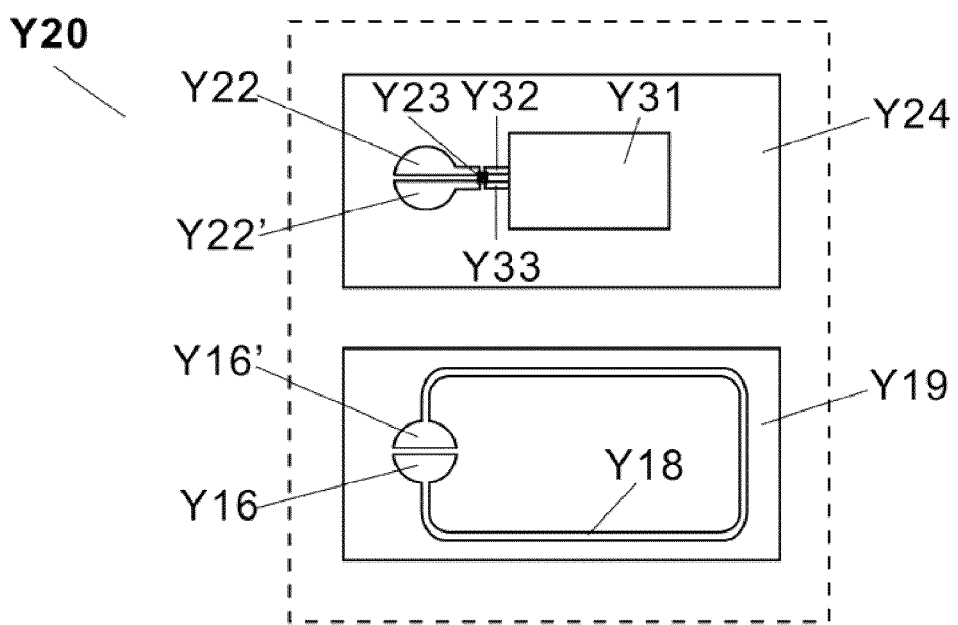
FIG. 22 is a plan view of an alternate embodiment of the MSRDS element of FIG. 13, illustrating a film-type power source between the top and bottom layer thereof.

Referring now to FIG. 22, an alternate exemplary embodiment of subcomponents that may be readily and advantageously utilized in conjunction with various embodiments of the inventive MSRDS elements illustrated in various figures herein and described in connection therewith (such as the MSRDS element 150a of FIGS. 5 and 13), is shown as a MSRDS element subcomponent set Y20 in a plan view. Like the subcomponent set X20 of FIG. 21, the subcomponent set Y20 can be advantageously utilized in powered (e.g., "active") inventive MSRDS element configurations which require a power source within the element itself. Such a power source may be a film-type (or equivalent), or a smaller type, battery Y31 positioned between the a top layer Y19 and a bottom layer Y24 in a MSRDS element configuration that may be similar to that shown for MSDS element 150a in the FIG. 13, but with a number of differences as follows:

(1) A microchip Y23 is provided, having four pins (not shown) that are connected with two pairs of contact pads: on one side with contact pads Y22, Y22' for connection an antenna Y18, and on another side with a set of circuits Y32, Y33 for the battery Y31, all positioned in a switching area of the bottom layer Y24;

(2) The top layer Y19 of the switch area also includes one pair of contact pads: Y16, Y16'. The contact pads Y16 and Y16' are preferably connected to the antenna Y18; and (3) The microchip Y23 receives continuous power from the battery Y31 through circuits Y32, Y33.

In operation of a novel MSRDS element supplied with the subcomponent set Y20, when pressure is applied to the switching area of the top layer Y19, the pair of antenna contact pads Y16, Y16' is brought into an electrical connection with the microchip contact pads Y22, Y22' so that the microchip Y23 is then connected to the antenna Y18 (through antenna contact pads Y22, Y22' and Y16, Y16') to be able to receive and broadcast radio or EM communication signals.

Figure 23:
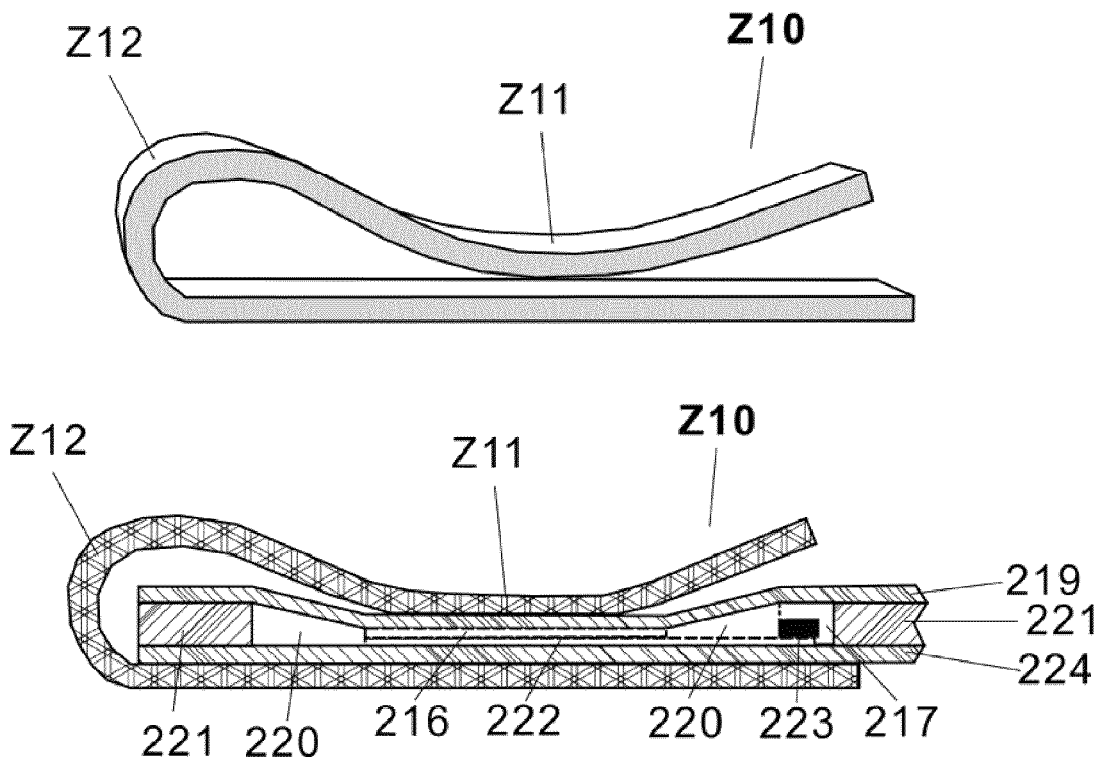
FIG. 23 is an isometric side view and a cross-sectional view of a removable clip-type retention component on its own, and also a cross-sectional view thereof as it may be advantageously used in conjunction with various embodiments of the inventive MSRDS element, to retain the membrane switch thereof in a continually pressed-down position.

Referring now to FIG. 23, an alternate exemplary embodiment of a subcomponent that may be readily and advantageously utilized in conjunction with various embodiments of the inventive MSRDS elements illustrated in various figures herein and described in connection therewith, is shown as a MSRDS element subcomponent clip Z10 in an isometric side view (on its own) and in a cross-sectional view (as it may be advantageously used in conjunction with the inventive MSRDS element 150a of FIG. 5, to retain the membrane switch thereof in a continually pressed-down position). The clip Z10 is preferably a removable clip that may be readily utilized by a user of various embodiments of the inventive MSRDS element to keep the switching area of the novel MSRDS element pressed down and to thus maintain it in an Always-ON security mode by default (until the clip Z10 is removed). The clip Z10 comprises a spring region Z12 and a press region Z11 (which is actually the region that presses down on the MSRDS element switching area). As shown in FIG. 23, by way of example, when the clip Z10 is applied to the MSRDS element 150a switching area, the spring region Z12 causes the press region Z11 to press down on the switch area of top layer 219, and to thereby bring the antenna contact pad 216 into electrical connection with the microchip contact pad 222, to keep the MSRDS element 150a in the Always-ON security mode until the clip Z10 is removed therefrom.

Referring now to FIGS. 24-28, various embodiments of user-operable re-usable inventive MSRDS element security mode controls subcomponents, each supplied with a corresponding releasable retention component, are shown. Advantageously, each retention component embodiment of the present invention, is advantageously operable to enable a user to selectively switch the MSRDS element default security modes between "Always-ON" and "Always-OFF" security modes, and, in at least one embodiment thereof, to lock a retention component in one desired (e.g., "retaining" or "released") position on the RDS device.

Figure 24:
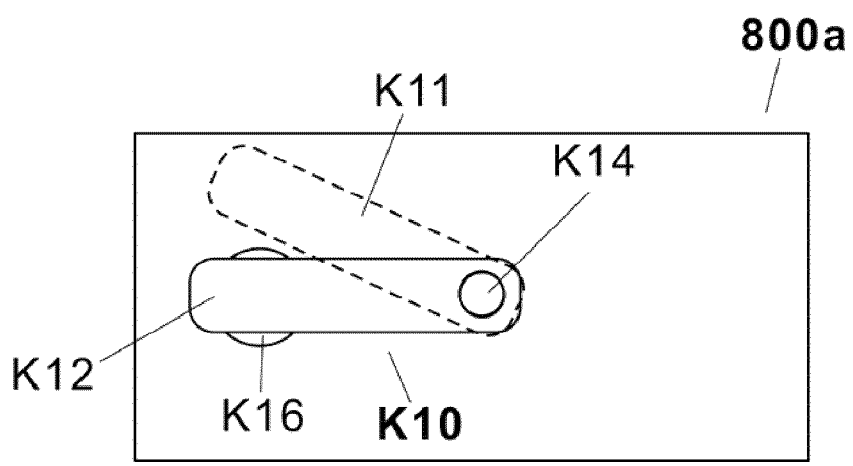
FIG. 24 is a plan view of an alternate embodiment of the inventive MSRDS element, illustrating a swivel-type retention component that may be advantageously utilized to selectively retain the membrane switch of the inventive MSRDS element in a continually pressed-down position.

Referring now to FIG. 24, a first exemplary embodiment of a security mode control subcomponent usable with an exemplary novel MSRDS element 800a, is shown as a releasable retention component K10. The releasable retention component K10 essentially comprises a swivel-type hand K12 sized and positioned such that it can be operated to swivel around a pivot K14, to be in a first position in which it presses down on a switch area K16 (corresponding to the inventive MSRDS element membrane switch) keeping the MSRDS element in a default Always-ON security mode. However, in an alternate position in which the swivel-type hand K11 is moved away from the switch area K16, thereby keeping the MSRDS element in a default Always-OFF security mode.

Figure 25:
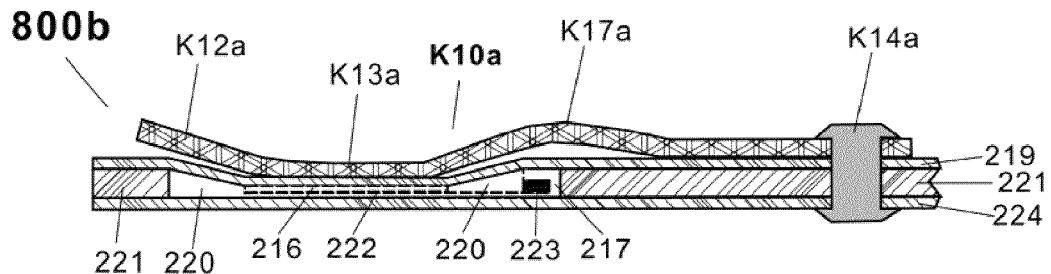
FIG. 25 is a cross-sectional view of the MSRDS element of FIG. 24, illustrating the swivel-type retention component in a position that continually presses down the membrane switch of the inventive MSRDS element.

Referring now to FIG. 25, an alternate exemplary embodiment of the releasable retention component K10 of FIG. 24, that may be readily and advantageously utilized in conjunction with an exemplary novel MSRDS element 800b, is shown as a releasable retention component K10a in a cross-sectional view (as it may be advantageously used in conjunction with the inventive MSRDS element 150a of FIG. 5, to retain the membrane switch thereof in a continually pressed-down position). The releasable retention component K10a includes a swivel-type hand K12a having a press region K13a, a spring region K17a and a pivot K14a. When the swivel-type hand K12a is swiveled in a position over the MSRDS element 150a switching area, the spring region K17a applies a pressure force to the press region K13a to cause it to press the MSRDS element 150a membrane switch down and to therefore bring the antenna contact pad 216 into electrical connection with the microchip contact pad 222, to thereby set the MSRDS element 150a into a default Always-ON security mode. Of course once the swivel-type hand K12a is moved such that the press region K13a is no longer positioned over the switch area, the MSRDS element 150a is then set into a default Always-OFF security mode.

Figure 26:
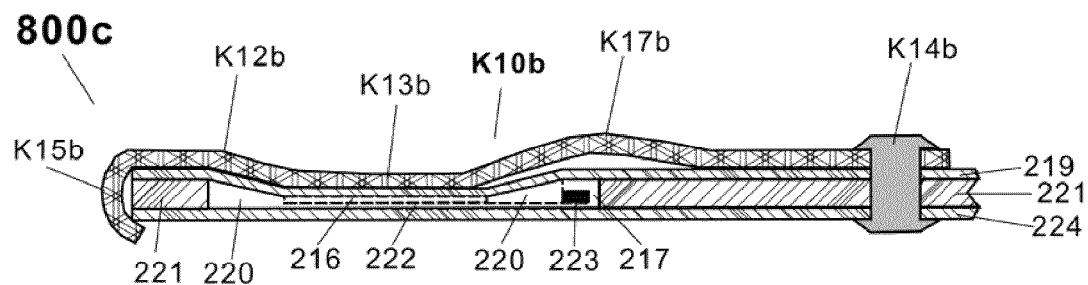
FIG. 26 is a cross-sectional view of an alternate embodiment of the MSRDS element of FIG. 24, illustrating a lockable swivel-type retention component that is not only capable of selectively retaining the inventive MSRDS element's membrane switch in a continually pressed-down position, but that may also be selectively locked (to a portion of the MSRDS element) in that position.

Referring now to FIG. 26, an alternate exemplary embodiment of the releasable retention component K10a of FIG. 25, that may be readily and advantageously utilized in conjunction with an exemplary novel MSRDS element 800c, is shown as a releasable retention component K10b in a cross-sectional view (as it may be advantageously used in conjunction with the inventive MSRDS element 150a of FIG. 5, to retain the membrane switch thereof in a continually pressed-down position).

Similarly to the releasable retention component K10a of FIG. 25, the releasable retention component K10b includes a swivel-type hand K12b having a press region K13b, a spring region K17b and a pivot K14b. When the swivel-type hand K12b is swiveled in a position over the MSRDS element 150a switching area, the spring region K17b applies a pressure force to the press region K13b to cause it to press the MSRDS element 150a membrane switch down and to therefore bring the antenna contact pad 216 into electrical connection with the microchip contact pad 222, to thereby set the MSRDS element 150a into a default Always-ON security mode. However, the releasable retention component K10b also includes a lock K15b sized, positioned, and configured to be operable to lock to the edge of the MSRDS element 150a when the swivel-type hand K12b is positioned with the press region K13b over the MSRDS element 150a switching area, thereby locking the MSRDS element 150a into an Always-ON security mode until the lock K15b is disengaged and the hand K12b is swiveled to remove the press region K13b from it position over the MSRDS element 150a switching area.

Figure 27:
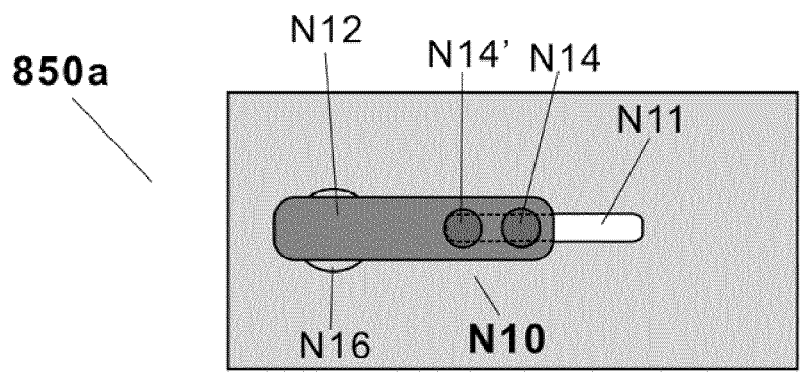
FIGS. 27 and 28 are plan views of an alternate embodiment of the inventive MSRDS element, illustrating a slide-type retention component, that may be advantageously operated to either: selectively retain the inventive MSRDS element's membrane switch in a continually pressed-down position (as shown in FIG. 27), or to leave the membrane switch un-pressed and exposed for selective operation thereof (as shown in FIG. 28)
Figure 28:
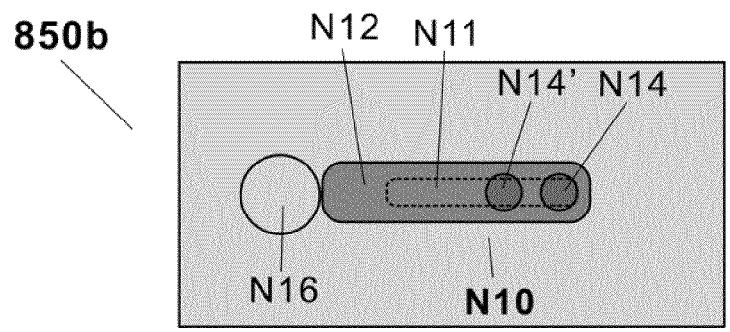

Referring now to FIGS. 27-28, a second exemplary embodiment of a security mode control subcomponent usable with exemplary novel MSRDS elements 850a, 850b is shown as a slide-type releasable retention component N10. The releasable retention component N10 may be advantageously operated to either: selectively retain a membrane switch N16 (of an inventive MSRDS element 850a) in a continually pressed-down position (as shown in FIG. 27), or to leave the membrane switch N16 (of an inventive MSRDS element 850b) un-pressed and exposed for selective operation thereof (as shown in FIG. 28). In FIG. 27 a top view of the MSRDS element 850a showing the releasable retention component N10 having a slide element N12 in a position in which it is presses down on the switch area N16, thereby locking the MSRDS element 850a into an Always-ON security mode. The slide element N12 includes lock elements N14 and N14' to lock it in to a slide slot N11. As shown in FIG. 28 (top view of the MSRDS element 850b), the slide element N12 is also operable by the user to slide away from the switching area N16 to remove pressure therefrom, thereby placing MSRDS element 850b into a default Always-OFF security mode.

Referring now to FIGS. 29-33 various exemplary embodiments of the inventive MSRDS element component layers, that comprise at least two membrane switches, are shown.

Figure 29:
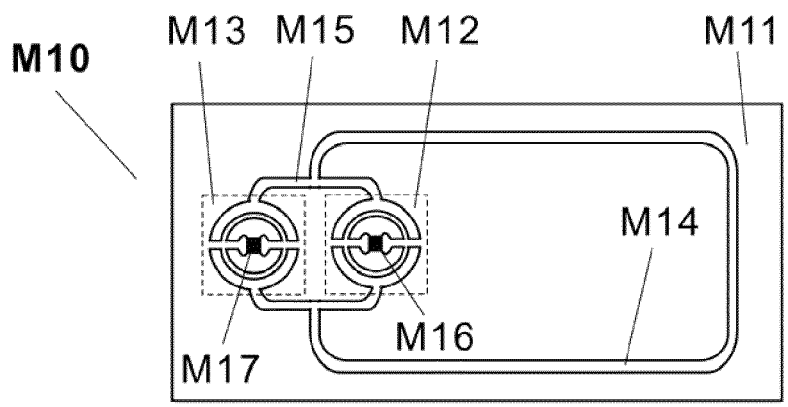
FIG. 29 is a plan view of a first exemplary embodiment of a membrane switch layer of an alternate embodiment of the inventive MSRDS element, having two separate exemplary membrane switches, each capable of activating or deactivating at least one MSRDS element function (which may be different for each switch) functions in response to selective operation thereof, and which are also capable of sharing a single antenna component provided in the same MSRDS element.

Referring now to FIG. 29, a first exemplary embodiment of the inventive MSRDS element switch component layer, that may be readily and advantageously utilized in conjunction with various embodiments of the inventive MSRDS elements illustrated in various figures herein and described in connection therewith, is shown in a plan view as a MSRDS element component layer M10. The MSRDS element component layer M10 comprises at least two exemplary membrane switches M12 and M13, each being operable to connect a corresponding microchip M16, M17, respectively, to a single antenna M14 through a circuit M15 provided in the same MSRDS element (essentially enabling the sharing of antenna M14 between the different microchips M16, M17).

Optionally, each membrane switch M12, M13 may also be capable of activating or deactivating at least one MSRDS element function (which may be different for each switch M12, M13) in response to selective operation thereof (for example in one or both microchips M16, M17). For example, the switches M12, M13 may be configured such that the antenna M14 is only connected to the corresponding microchip (not shown) of the MSRDS element (in which the component layer M10 is used), when both switches M12, M13 are pressed down and held at the same time.

Referring now to FIG. 30, a second exemplary embodiment of the inventive MSRDS element switch component layer, that may be readily and advantageously utilized in conjunction with various embodiments of the inventive MSRDS elements illustrated in various figures herein and described in connection therewith, is shown in a plan view as a MSRDS element component layer P10. The MSRDS element component layer P10 comprises at least two exemplary membrane switches P12 and P14, with switch P12 being connected to an antenna P13, and being operable to connect or disconnect the antenna P13 from corresponding microchip P16 of the MSRDS element in which the component layer P10 is utilized (e.g., microchips P16, and P17, respectively), while the switch P14 being connected to an antenna P15 and being operable to connect or disconnect the antenna P15 from corresponding microchip P17 of the MSRDS element in which the component layer P10 is utilized.

In one exemplary configuration of the component layer P10, the antennae P13 and P15 may be configured to operate in different frequency bands. For example, antenna P13 may be a high frequency (HF) antenna, while the antenna P15 may be an ultra high frequency (UHF) antenna. Thus, the membrane switches P12, P14 may be advantageously operated by a user to select between use of two (or more) different antennae on a single MSRDS element in which the component layer P10 is utilized (for example associating each antenna with a corresponding microchip), or even to use both antennae P13, P15 at once. In addition, to selectively activating/deactivating one or both antennae P13, P15, the membrane switches P12, P14 may also be used to activate one or more additional functions of the MSRDS element in which the component layer P10 is utilized.

Figure 31:
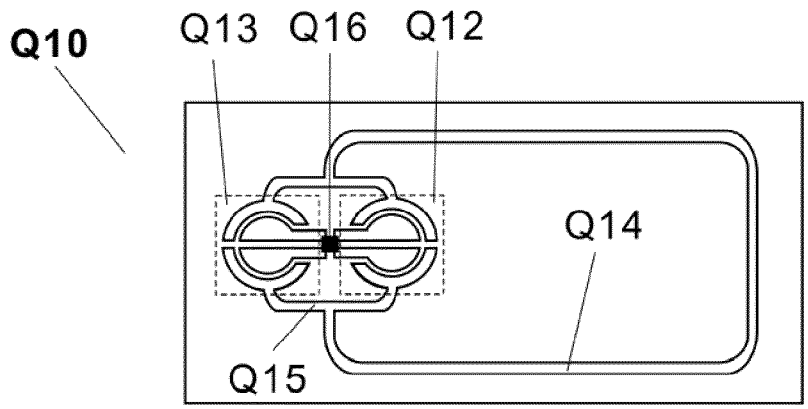
FIG. 31 is a plan view of a third exemplary embodiment of a membrane switch layer of an alternate embodiment of the inventive MSRDS element, having two separate exemplary membrane switches, each connected to at least one electronic component (e.g., a microchip), each capable of selectively accessing different features of the at least one electronic component in response to selective operation thereof, and which are also capable of sharing a single antenna component provided in the same MSRDS element.

Referring now to FIG. 31, a third exemplary embodiment of the inventive MSRDS element switch component layer, that may be readily and advantageously utilized in conjunction with various embodiments of the inventive MSRDS elements illustrated in various figures herein and described in connection therewith, is shown in a plan view as a MSRDS element component layer Q10. The MSRDS element component layer Q10 comprises at least two membrane switches Q12, Q13, and a microchip Q16 having at least four pins/contacts (not shown), with one set of two pins/contacts being connected to the switch Q12 and the other set of two pins/contacts being connected to the switch Q13. Both switches Q12, Q13 are preferably connected to an antenna Q14 through a circuit Q15, such that each switch Q12, Q13 is operable to selectively access and/or control different features of the microchip Q16, and which are capable of sharing the single antenna Q14 provided in the same MSRDS element in which the component layer Q10 is utilized.

Referring now to FIG. 32, a fourth exemplary embodiment of the inventive MSRDS element switch component layer, that may be readily and advantageously utilized in conjunction with various embodiments of the inventive MSRDS elements illustrated in various figures herein and described in connection therewith, is shown in a plan view as a MSRDS element component layer R10. The MSRDS element component layer R10 comprises at least two membrane switches R12, R14, and a microchip R16 having at least four pins/contacts (not shown), with one set of two pins/contacts being connected to the switch R12 and the other set of two pins/contacts being connected to the switch R14. The switch R12 is connected to, and operable to selectively activate, a first antenna R13, while the switch R14 is connected to, and operable to selectively activate, a second antenna R15.

In one exemplary configuration of the component layer R10, the antennae R13 and R15 may be configured to operate in different frequency bands. For example, antenna R13 may be a high frequency (HF) antenna, while the antenna R15 may be an ultra high frequency (UHF) antenna. Thus, the membrane switches R12, R14 may be advantageously operated by a user to select between use of two (or more) different antennae on a single MSRDS element in which the component layer R10 is utilized, or even to use both antennae R13, R15 at once to expand operation of the MSRDS element to multiple frequency bands. In addition, to selectively activating/deactivating one or both antennae R13, R15, the membrane switches R12, R14 may also be used to activate one or more additional functions of the MSRDS element in which the component layer R10 is utilized.

Figure 33:
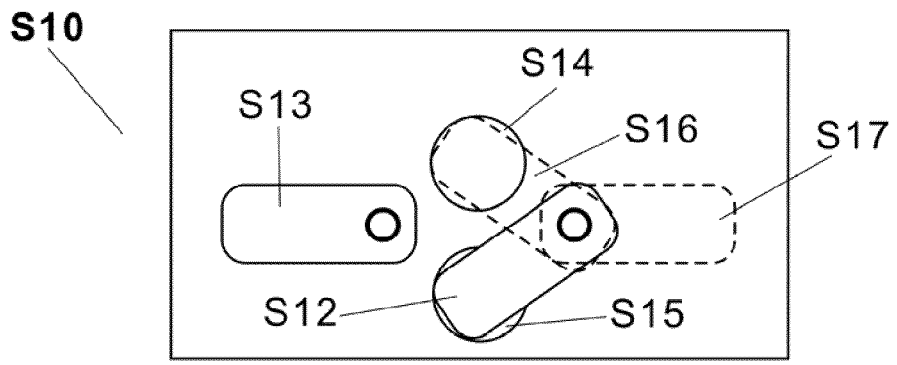
FIG. 33 is a plan view of an alternate embodiment of the inventive MSRDS elements of FIGS. 29-32, illustrating two swivel-type retention components that may be advantageously and independently operated to selectively to either retain at least one of the two MSRDS element's membrane switches in a continually pressed-down position, or to leave both membrane switches un-pressed and exposed for selective operation thereof.

Referring now to FIG. 33, an alternate exemplary embodiment of the inventive MSRDS element switch component layer, that may be readily and advantageously utilized in conjunction with various embodiments of the inventive MSRDS elements illustrated in various figures herein and described in connection therewith, and that may be specifically utilized in conjunction with MSRDS element component layer embodiments of FIGS. 29-32 (each of which comprises at least two membrane switches), is shown in a plan view as a MSRDS element component layer S10.

The MSRDS element component layer S10 comprises at least one swivel-type retention component S12 (and optionally an additional component S13) that may be advantageously and independently operated to selectively retain one or two proximally positioned membrane switches S14, S15, of the inventive MSRDS element in which the component layer S10 is utilized, in a continually pressed-down position, or to release one or both of the switches S14, S15. Thus, when swivel-type retention component S12 is positioned over the switch S15, the switch S15 is kept pressed down and is thus set to a default Always-ON security mode.

The swivel-type retention component S12 is also operable to be swiveled to a position S16 so that it is disposed over the switch S14, thereby keeping the switch S14 in a default Always-ON security mode. Additionally, the swivel-type retention component S12 is operable to be swiveled into a position S17 in which it does not press on either switch S14 or S15. If provided, the additional other swivel-type retention component S13 is operable in a substantially similar manner as described above with respect to component S12. So, if only one swivel-type retention component S12 is used in the component layer S10 with two switches S14, S15, then the retention component S12 is operable to keep one of the two switches S14, S15 in an OFF position, or to keep both switches S14, S15 in an ON position. If the optional additional retention component S13 is also provided, then the switches S14, S15 can be kept in any of the following configurations: OFF/OFF, ON/OFF, OFF/ON, and ON/ON.

Figure 34:
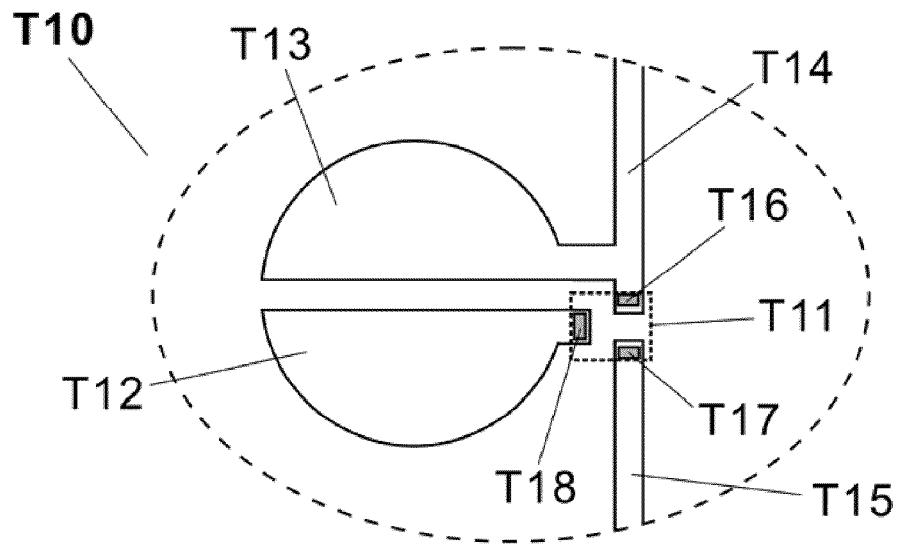
FIG. 34 is a partial plan view of an exemplary embodiment of an electronic component (e.g., a microchip) of the inventive MSRDS element, having three contact subcomponents that connect with contact pads, and at least one antenna of the inventive MSRDS element.

Referring now to FIG. 34, a first exemplary embodiment of an electronic component (e.g., a microchip) switching configuration of the inventive MSRDS element that may be readily and advantageously utilized in conjunction with various embodiments of the inventive MSRDS elements illustrated in various figures herein and described in connection therewith, is shown in a partial plan view as a MSRDS element microchip switching configuration T10, utilized in conjunction with a microchip T11, which provides switching and antenna connect/disconnect capabilities both inside and outside of the microchip T11, to provide switch capability to the inventive MSRDS element in which the switching configuration T10 is utilized.

The microchip T11 includes three contact pins T16, T17 and T18. A contact pad T13 and an antenna link T14 are connected to the contact pin T16, while a contact pad T12 is connected to the contact pin T18, and an antenna link T15 is connected to the contact pin T17. Preferably, the microchip T11 is configured such that the contact pins T16 and T18 are not connected to another inside the microchip T11, so that the microchip T11 will not function until the contact pins T16 and T18 are connected to one another through a closed circuit outside of the microchip T11. This connection is readily accomplished, and the microchip T11 is activated and connected to corresponding antenna links T14, T15, when the contact pad T12 is connected to the contact pad T13 through a bridge contact pad (not shown herein, but shown and described in connection with various embodiments of the inventive MSRDS element, above).

Figure 35:
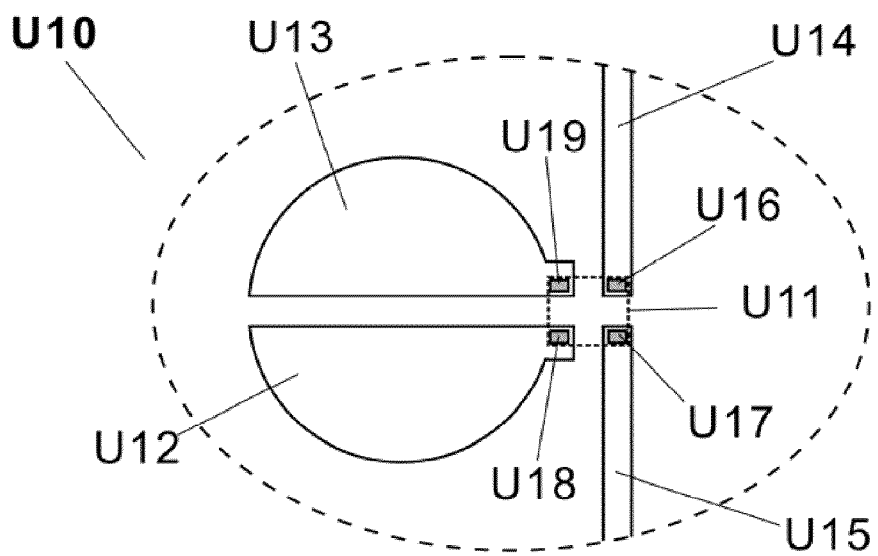
FIG. 35 is a partial plan view of an alternate exemplary embodiment of an electronic component (e.g., a microchip) of the inventive MSRDS element, having contact subcomponents that connect with contact pads, and at least one antenna of the inventive MSRDS element.

Referring now to FIG. 35, a second exemplary embodiment of an electronic component (e.g., a microchip) switching configuration of the inventive MSRDS element that may be readily and advantageously utilized in conjunction with various embodiments of the inventive MSRDS elements illustrated in various figures herein and described in connection therewith, is shown in a partial plan view as a MSRDS element microchip switching configuration U10, utilized in conjunction with a microchip U11, which provides switching and antenna connect/disconnect capabilities both inside and outside of the microchip U11, to provide switch capability to the inventive MSRDS element in which the switching configuration U10 is utilized.

The microchip U11 includes four contact pins U16, U17, U18, and U19. A contact pad U12 is connected to the contact pin U18, a contact pad U13 is connected to the contact pin U19, an antenna link U14 is connected to the contact pin U16, while an antenna link U15 is connected to the contact pin U17. Preferably, the microchip U11 is configured such that the contact pins U18 and U19 are not connected to another inside the microchip U11, so that the microchip U11 will not function until the contact pins U18 and U19 are connected to one another through a closed circuit outside of the microchip U11. This connection is readily accomplished, and the microchip U11 is activated and connected to corresponding antenna links U14, U15, when the contact pad U12 is connected to the contact pad U13 through a bridge contact pad (not shown herein, but shown and described in connection with various embodiments of the inventive MSRDS element, above).

Figure 36:
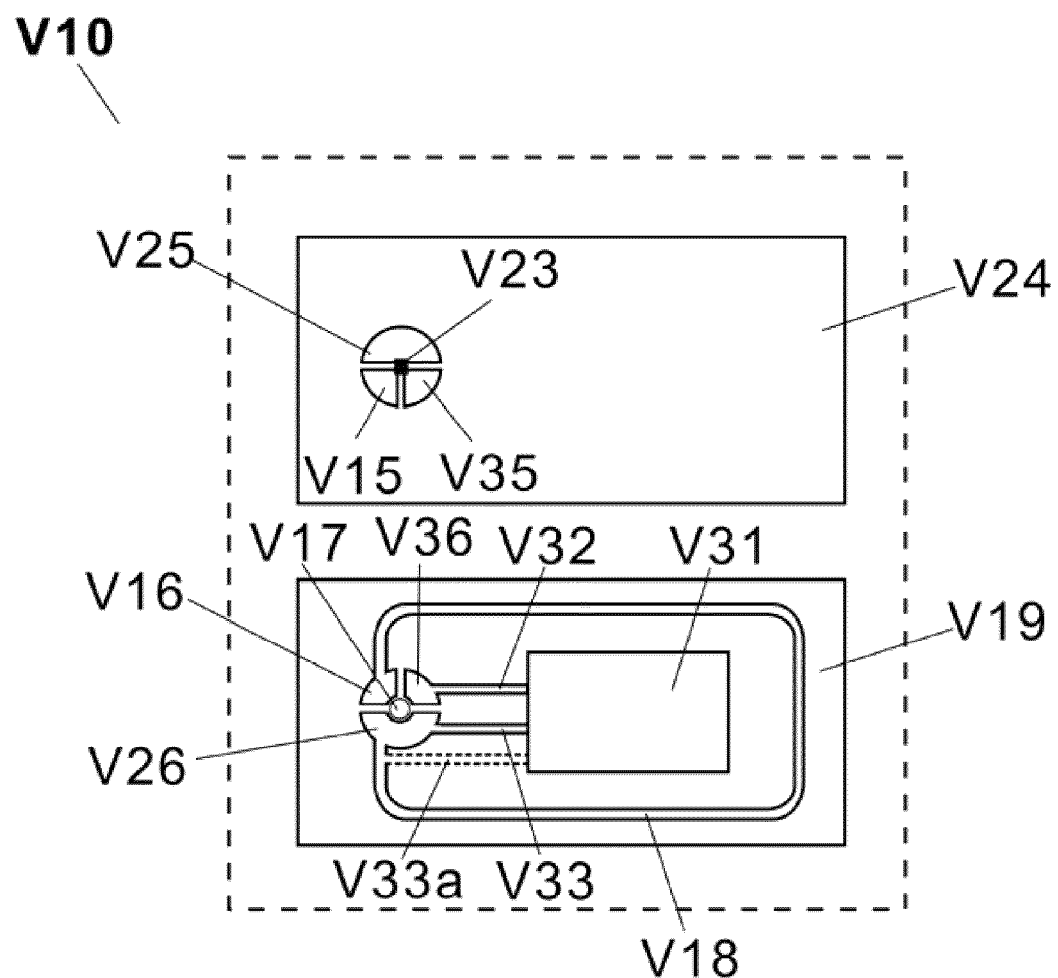
FIG. 36 is a partial plan view of an alternate exemplary embodiment of an electronic component (e.g., a microchip) of the inventive MSRDS element, having contact subcomponents that are operable to connect with contact pads, terminals of a film-type power source between the top and bottom layer thereof, and with terminals at least one antenna of the inventive MSRDS element.

Referring now to FIG. 36, a third exemplary embodiment of an electronic component (e.g., a microchip) switching configuration of the inventive MSRDS element that may be readily and advantageously utilized in conjunction with various embodiments of the inventive MSRDS elements, illustrated in various figures herein and described in connection therewith, in which a power source has been provided therefor, is shown in a partial plan view as a MSRDS element microchip switching configuration V10, utilized in conjunction with a microchip V23, which provides switching and antenna connect/disconnect capabilities both inside and outside of the microchip V23, and that works in conjunction with a power source V31 (such as film-type (or equivalent or smaller) battery disposed between the top layer V19 and bottom layer V24 of the MSRDS element) to provide switch capability to the inventive MSRDS element in which the switching configuration V10 is utilized, and which may be advantageously used as an alternate embodiment of MSRDS element subcomponent set X20 of FIG. 21 (the operation of which is described in greater detail above, in connection with FIG. 21).

The microchip V23 is preferably positioned on the bottom layer V24 in an open microchip housing region V17, and includes three pins (not shown), a first pin being connected to a contact pad V15 (for electrically connecting to an antenna V18), a second pin being connected to a contact pad V25 (for electrically connecting to the power source V31, to the antenna V18, and optionally to a ground integrated the MSRDS element), and a third pin being connected to a contact pad V35 (for electrically connecting to the power source V31).

The power source V31 may be positioned on the top layer V19, and preferably includes a pair of electrical links V32 and V33. The electrical link V32 is preferably connected to a contact pad V36 positioned on the top layer V19, while the electrical link V33 is preferably connected to a contact pad V26 also positioned on the top layer V19. One terminal of the antenna V18 is also connected to the contact pad V26, while the other terminal of the antenna V18 is connected to a contact pad V16 positioned on the top layer V19. In an alternate embodiment of the MSRDS element microchip switching configuration V10, the power source V31 electrical link V33 may be replaced by an alternate electrical link V33a, that connects one electrical terminal of the power source V31 to the first terminal area of the antenna V18, instead of connecting it to the contact pad V26.

Thus, while there have been shown and described and pointed out fundamental novel features of the inventive system and method as applied to exemplary embodiments thereof, it will be understood that various omissions and substitutions and changes in the form and details of the products and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A resonant data storage device for securely storing data that is only accessible by at least one compatible resonant data access apparatus when the resonant data storage device is in an ON mode, and for otherwise preventing access to the stored data, comprising:
   at least one electronic component operable to store the data;
   at least one antenna, operable to enable wireless access to at least one of said electronic component;
   at least one security mode selection component, that when engaged, is operable to electrically connect at least one of said antenna to at least one of said electronic component to thereby place the resonant data storage device into the ON mode, accessible to at least one compatible resonant data access apparatus, only for the duration of said engagement thereof, such that when at least one of said security mode selection component is released, at least one of said antenna is automatically disconnected from at least one of said electronic component; and
   at least one security mode control component is engaged, to maintain at least one of said security mode selection component in a continually engaged position to thereby maintain the resonant data storage device in a continuous ON mode, and that when disengaged, enables user-controlled selective engagement and/or disengagement of at least one of said security mode selection component.

2. The resonant data storage device of claim 1, wherein at least one of said security mode selection component comprises at least one plural-break switch, that, when disengaged severs at least two electrical connections.

3. The resonant data storage device of claim 2, wherein at least two of said electrical connections comprise a connection between at least one of said electronic component and at least one of said antenna.

4. The resonant data storage device of claim 1, wherein at least one of said antenna is selected from a group comprising at least one of: a low frequency (LF) antenna, a high frequency (HF) antenna, an ultra high frequency (UHF) antenna, a WIFI antenna, a Bluetooth antenna, a NFC antenna, a microwave antenna, a cellular antenna, a satellite antenna, and/or a RuBee magnetic antenna.

5. The resonant data storage device of claim 1, wherein at least one of said security mode selection component comprises a membrane switch that causes and maintains an electrical connection, only while sufficient pressure is applied thereto, and that otherwise disconnects at least one of said antenna from at least one of said electronic component.

6. The resonant data storage device of claim 1, wherein at least one of said electronic component comprises at least one first electrical contact connected thereto, wherein at least one of said antenna comprises at least one second electrical contact connected thereto, said first and second contacts being sized, positioned and configured such that when at least one of said security mode selection component is engaged, at least one of said first contact is placed into electrical contact with said at least one second contact to thereby form a closed electrical circuit within switching area.

7. The resonant data storage device of claim 6, further comprising at least one electromagnetic shielding component operable to prevent said electrical contacts from undesirably enabling unauthorized wireless access to at least one of said electronic component.

8. The resonant data storage device of claim 6, wherein each of said first and said second electrical contacts comprise a substantially flat contact pad composed of an electrically conductive material.

9. The resonant data storage device of claim 1, further comprising a plurality of stacked layers at least partially affixed to one another, said plural stacked layers comprising a housing region defined therein sized and configured to store at least one of said electronic component, and wherein at least one of said antenna, at least one of said security mode selection component, and at least one of said security mode control component are each at least in partially disposed on at least one of said plural layers.

10. The resonant data storage device of claim 1, further comprising a plurality of stacked layers at least partially affixed to one another, said plural stacked layers comprising at least one housing region defined therein sized and configured to store air compressed by engagement of at least one of said security mode selection component, in addition to storing at least one of said electronic component, and wherein at least one of said antenna, at least one of said security mode selection components, and at least one of said security mode control component are each at least in partially disposed on at least one of said plural layers.

11. The resonant data storage device of claim 1, wherein at least one of said electronic component comprises an active component requiring electrical power for operation thereof, further comprising a battery element positioned within the resonant data storage device, and being operable to supply electrical power through an electrical connection therewith, and when at least one of said security mode selection component is engaged, to thereby provide power to at least one of said electronic component during engagement thereof.

12. The resonant data storage device of claim 1, wherein at least one of said electronic component comprises at least one component electrical contact, wherein at least one of said antenna comprises at least one antenna contact, and wherein at least one of said security mode selection component, further comprises at least one electrically conductive bridge element, said electrically conductive bridge element being positioned, sized and configured to be operable, when at least one of said security mode selection component is engaged, to electrically connect at least one of said component electrical contact with at least one of said antenna contact to thereby place the resonant data storage device in the ON mode and accessible by at least one compatible data access apparatus.

13. The resonant data storage device of claim 1, wherein at least one of said electronic component comprises a single predetermined electronic component being further operable to perform at least one additional function, wherein at least one of said antenna comprises a single antenna of a predefined configuration, and wherein at least one of said security mode selection component, comprises a plurality of switches being operable to:
   electrically connect said antenna to said predetermined electronic component to thereby place the resonant data storage device into the ON mode, accessible to at least one compatible resonant data access apparatus, only for the duration of said engagement thereof, such that when at least one of said security mode selection component is released, said antenna is automatically disconnected from said predetermined electronic component; and
   selectively control performance by said predetermined electronic component of at least one of said additional function.

14. The resonant data storage device of claim 1, wherein at least one of said electronic component comprises a plurality of predetermined electronic components being further operable to perform at least one additional function, wherein at least one of said antenna comprises a single antenna of a predefined configuration, and wherein at least one of said security mode selection component, comprises a plurality of switches, each associated with a corresponding plural predetermined electronic component, and being operable to:
   electrically connect said antenna to at least one of said plural predetermined electronic components to thereby place the resonant data storage device into the ON mode, with respect to data stored in said connected plural predetermined electronic component; and
   selectively control performance, by at least one of said plural predetermined electronic components, of at least one of said additional function.

15. The resonant data storage device of claim 1, wherein at least one of said electronic component comprises a plurality of predetermined electronic components being further operable to perform at least one additional function, wherein at least one of said antenna comprises a plurality of antennae—each with a different predefined configuration—and wherein at least one of said security mode selection component, comprises a plurality of switches, each associated with a corresponding plural predetermined electronic component, and with a corresponding plural antenna, and being operable to:
   electrically connect at least one of said plural antennae to said corresponding associated at least one of said plural predetermined electronic components, to thereby place the resonant data storage device into the ON mode, with respect to data stored in said connected plural predetermined electronic component; and
   selectively control performance, by at least one of said plural predetermined electronic components, of at least one of said additional function.

16. The resonant data storage device of claim 1, wherein at least one of said electronic component comprises a single predetermined electronic component, wherein at least one of said antenna comprises a plurality of antennae—each with a different predefined configuration—and wherein at least one of said security mode selection component, comprises a plurality of switches, each associated with a corresponding plural antenna, and being operable to:
   electrically connect at least one of said plural antennae to said single predetermined electronic component, to thereby place the resonant data storage device into the ON mode, with respect to data stored in said connected single predetermined electronic component, and to enable wireless access to the stored data in a wireless connection supported by at least one of said connected plural antenna.

17. The resonant data storage device of claim 1, wherein at least one of said electronic component further comprises an open electrical circuit therein, and a pair of external activation electrical contacts, and configured to only be operable when said external activation electrical contacts are electrically connected to one another, wherein at least one of said security mode selection component, is sized, configured, and positioned, to be operable, when engaged, to thereby activate at least one of said electronic component, and to place the resonant data storage device into the ON mode.

18. The resonant data storage device of claim 1, further comprising a substantially internal switch region, wherein at least one of said security mode selection component is at least partially positioned in said switch region, and wherein at least one of said electronic component is positioned within said switch region.

19. The resonant data storage device of claim 1, configured for use in conjunction with a predetermined product, wherein the resonant data storage device comprises one of: a resonant tag or a resonant card operable to house the various subcomponents thereof, wherein said resonant tag or resonant card is operable to be at least one of: attached to said product, be releasably attached to said product, or integrated into said product as a subcomponent thereof.

20. A method, for utilizing the resonant data storage device of claim 1, for enhancing logistics, record-keeping, and data tracking capabilities in connection with commercial transactions involving a plurality of products originated from a manufacturer, each plural product comprising unique product data associated therewith, the plural products being transported from the manufacturer and sold, by at least one intermediary party, to a customer, said method comprising, for each plural product, the steps of:

(a) providing the resonant data storage device comprising at least one of said security mode control component configured in an engaged position, such that the resonant data storage device in a continual ON mode, and accessible by at least one resonant data access apparatus, (b) storing product data corresponding to said plural product in at least one of said electronic component of the resonant data storage device, (c) positioning the resonant data storage device in at least one of: close proximity to, or in attachment with, the corresponding plural product, such that the resonant data storage device is accessible by a plurality of resonant data access systems of the manufacturer and/or of at least one intermediary party, in connection with product-related commercial and/or logistical operations thereof; and (d) in connection with a sale of the plural product to the customer, disengaging at least one of said security mode control component from at least one of said security mode selection component, to place the resonant data storage device in an OFF mode, such that the product data stored in the resonant data storage device is thereafter only accessible when at least one of said security mode selection component is maintained in an engaged position.

21. The resonant data storage device of claim 1, wherein said resonant data storage device is a type of: tags, cards, and/or embedded elements.

22. The resonant data storage device of claim 1, wherein said resonant data storage device is at least one of: ID cards, payment cards, gift cards, access cards, multifunction cards, remote cards, media cards, loyalty cards, ID tags, payment tags, gift tags, access tags, multifunction tags, remote tags, media tags, loyalty tags, key tags, product tags, hang tags, tickets, labels, passports.

23. The resonant data storage device of claim 1, further comprising a plurality of stacked layers at least partially affixed to one another, at least one of said electronic component and at least one of said antenna formed on one of said plurality layers, wherein at least one of said electronic component, and at least one of said antenna located on the same layer or different layer.

24. A resonant data storage device for securely storing data that is only accessible by at least one compatible resonant data access apparatus when the resonant data storage device is in an ON mode, and for otherwise preventing access to the stored data, comprising:

at least one electronic component operable to store the data;

at least one antenna, operable to enable wireless access to at least one of said electronic component;

at least one security mode selection component, that when engaged, is operable and thereby place the resonant data storage device into the ON mode; and at least one security mode control component is selectively operable to be selectively disposed in a first position or in a second position, and wherein each at least one of said security mode control component comprises:

a releasable retention component operable to selectively move at least one of said security mode control component between said first and said second positions, and a pressure component sized, positioned and configured on said releasable retention component, to:

when at least one of said security mode control component is in said first position, maintain sufficient pressure on one at least one of said security mode selection component to keep at least one of said security mode selection component continually engaged, thereby maintaining the resonant data storage device in the ON mode, accessible by at least one compatible data access apparatus, and when at least one of said security mode control component is in said second position, remove pressure from at least one of said security mode selection component to disengage at least one of said security mode selection component, thereby maintaining the resonant data storage device in an OFF mode, and preventing access thereto by at least one compatible data access apparatus.

25. The resonant data storage device of claim 24, wherein each of said first and said second positions comprise different regions of the resonant data storage device, wherein:

moving at least one of said releasable retention components to said first position, comprises aligning said pressure component in a first region corresponding to at least one of said security mode selection component to apply pressure thereto sufficient to maintain continual engagement thereof, while moving at least one of said releasable retention components to said second position, comprises moving said pressure component away from said first region to another region of the resonant data storage device.

26. The resonant data storage device of claim 25, wherein at least one of said releasable retention component comprises a sliding element operable to slidably move said pressure component between said first and said second positions.

27. The resonant data storage device of claim 25, wherein at least one of said releasable retention components comprises a swivel-type element operable to swivel in a plane parallel to said releasable retention component, to thereby move said pressure component between said first and said second positions.

28. The resonant data storage device of claim 27, wherein at least one of said releasable retention components further comprises a lock element to releasably lock said swivel-type element in said first position.

29. The resonant data storage device of claim 27, wherein at least one of said releasable retention components is configured for being usable only once, such that upon removal thereof from the resonant data storage device, thereafter access to at least one of said electronic component is controlled solely through at least one of said security mode selection component.

30. The resonant data storage device of claim 24, wherein said first position comprises a predefined region of the resonant data storage device comprising at least one of said security mode selection component, and wherein said second positions comprises a region outside and away from the resonant data storage device, wherein:

moving at least one of said releasable retention components to said first position, comprises aligning said pressure component in a first region corresponding to at least one of said security mode selection component to apply pressure thereto sufficient to maintain continual engagement thereof, while moving said releasable retention components to said second position, comprises completely removing said releasable retention component from the resonant data storage device, to disengage said pressure component from at least one of said security mode selection component, and to thereby remove at least one of said security mode control component from the resonant data storage device.

31. The resonant data storage device of claim 30, wherein at least one of said releasable retention components comprises of a clip element mountable on the resonant data storage device, and completely removable therefrom, said clip element comprising said pressure component defined therein, and also comprising a spring component operable to enable said pressure component to apply sufficient pressure to at least one of said security mode selection component when positioned thereon.

32. The resonant data storage device of claim 30, wherein the resonant data storage device comprises a layered body, wherein at least one of said security mode selection component comprises a membrane switch, and wherein at least one of said releasable retention components comprises a retaining layer element positioned on, or in, the resonant data storage device, and completely removable therefrom, said layer element comprising said pressure component defined thereon, sized positioned and configured to apply sufficient pressure to at least one of said security mode selection component when aligned therewith in said first position, and wherein said retaining layer element is operable for removal from the resonant data storage device by at least one of: tearing off, sliding out, and/or peeling off.

33. The resonant data storage device of claim 32, wherein at least one of said security mode selection component further comprises a tab element accessible by a user, connected to said retaining layer element, said tab element being selectively operable to facilitate removal of said retaining layer element from the resonant data storage device.

34. A resonant data storage device for securely storing data that is only accessible by at least one compatible resonant data access apparatus when the resonant data storage device is in an ON mode, and for otherwise preventing access to the stored data, comprising:
at least one electronic component operable to store the data;
at least one antenna, operable to enable wireless access to at least one of said electronic component;
at least two of stacked layers at least partially affixed to one another, to thereby form at least one security mode selection component, wherein at least one of said electronic component and at least one of said antenna are formed on or in at least one of said stacked layer;
at least one housing region defined therein sized, configured and positioned to store at least one of said electronic component, wherein at least one of said housing region located on or in at least one of said stacked layer; and
at least two electronic contacts being sized, positioned and configured on at least two of said stacked layers, located in switching area of at least one of said security mode selection component;
whereby at least one of said security mode selection component, that when engaged, at least two of said electronic contacts in connected, to place the resonant data storage device into the ON mode.

35. The resonant data storage device of claim 34, further comprising a battery element, wherein at least one of said battery element of contact is connected to at least one of said antenna and/or at least one of said electronic component.

36. The resonant data storage device of claim 34, wherein at least one of said stacked layer further comprises at least one dome-like button within at least one of said security mode selection component of switching area.

37. The resonant data storage device of claim 34, wherein at least one of said security mode selection component comprises a membrane switch that causes and maintains an electrical connection, only while sufficient pressure is applied thereto, and that otherwise disconnects at least one of said antenna from at least one of said electronic component.

38. The resonant data storage device of claim 34, wherein at least one of said electronic component comprises a single predetermined electronic component being further operable to perform at least one additional function, wherein at least one of said antenna comprises a single antenna of a predefined configuration, and wherein at least one of said security mode selection component, comprises a plurality of switches being operable to:
electrically connect said antenna to said predetermined electronic component to thereby place the resonant data storage device into the ON mode, accessible to at least one compatible resonant data access apparatus, only for the duration of said engagement thereof, such that when at least one of said security mode selection component is released, said antenna is automatically disconnected from said predetermined electronic component; and
selectively control performance by said predetermined electronic component of at least one of said additional function.

39. The resonant data storage device of claim 34, wherein at least one of said electronic component comprises a plurality of predetermined electronic components being further operable to perform at least one additional function, wherein at least one of said antenna comprises a single antenna of a predefined configuration, and wherein at least one of said security mode selection component, comprises a plurality of switches, each associated with a corresponding plural predetermined electronic component, and being operable to:
electrically connect said antenna to at least one of said plural predetermined electronic components to thereby place the resonant data storage device into the ON mode, with respect to data stored in said connected plural predetermined electronic component; and
selectively control performance, by at least one of said plural predetermined electronic components, of at least one of said additional function.

40. The resonant data storage device of claim 34, wherein at least one of said electronic component comprises of a plurality of predetermined electronic components being further operable to perform at least one additional function, wherein at least one of said antenna comprises a plurality of antennae—each with a different predefined configuration—and wherein at least one of said security mode selection component, comprises a plurality of switches, each associated with a corresponding plural predetermined electronic component, and with a corresponding plural antenna, and being operable to:
electrically connect at least one of said plural antennae to said corresponding associated at least one of said plural predetermined electronic components, to thereby place the resonant data storage device into the ON mode, with respect to data stored in said connected plural predetermined electronic component; and
selectively control performance, by at least one of said plural predetermined electronic components, of at least one of said additional function.

41. The resonant data storage device of claim 34, wherein at least one of said electronic component comprises a single predetermined electronic component, wherein at least one of said antenna comprises a plurality of antennae—each with a different predefined configuration—and wherein at least one of said security mode selection component, comprises a plurality of switches, each associated with a corresponding plural antenna, and being operable to:

electrically connect at least one of said plural antennae to said single predetermined electronic component, to thereby place the resonant data storage device into the ON mode, with respect to data stored in said connected single predetermined electronic component, and to enable wireless access to the stored data in a wireless connection supported by at least one of said connected plural antenna.

42. The resonant data storage device of claim 34, wherein at least one of said electronic component further comprises an open electrical circuit therein, and a pair of external activation electrical contacts, and configured to only be operable when said external activation electrical contacts are electrically connected to one another, when engaged, to thereby activate at least one of said electronic component, and to place the resonant data storage device into the ON mode.

43. The resonant data storage device of claim 34, further comprising a substantially internal switch region, wherein at least one of said security mode selection component is at least partially positioned in said switch region, and wherein at least one of said electronic component is positioned within said switch region.

* * * * *